United States Patent
Backhaus-Ricoult et al.

(10) Patent No.: US 11,229,902 B2
(45) Date of Patent: Jan. 25, 2022

(54) POROUS ARTICLE AND METHOD OF MANUFACTURING THE SAME

(71) Applicant: Corning Incorporated, Corning, NY (US)

(72) Inventors: Monika Backhaus-Ricoult, Bourron (FR); Boris Nikolayevich Tsvetkov, Murino (RU)

(73) Assignee: Corning Incorporated, Corning, NY (US)

( * ) Notice: Subject to any disclaimer, the term of this patent is extended or adjusted under 35 U.S.C. 154(b) by 455 days.

(21) Appl. No.: 16/304,853

(22) PCT Filed: May 31, 2017

(86) PCT No.: PCT/US2017/035125
§ 371 (c)(1),
(2) Date: Nov. 27, 2018

(87) PCT Pub. No.: WO2017/210251
PCT Pub. Date: Dec. 7, 2017

(65) Prior Publication Data
US 2020/0324279 A1    Oct. 15, 2020

Related U.S. Application Data

(60) Provisional application No. 62/343,496, filed on May 31, 2016.

(51) Int. Cl.
*B01J 35/04* (2006.01)
*B01D 46/24* (2006.01)
(Continued)

(52) U.S. Cl.
CPC ............ *B01J 35/04* (2013.01); *B01D 46/247* (2013.01); *B01D 46/2429* (2013.01);
(Continued)

(58) Field of Classification Search
None
See application file for complete search history.

(56) References Cited

U.S. PATENT DOCUMENTS 4,295,892 A    10/1981  Matsuhisa et al.
4,327,188 A     4/1982  Endo et al.
(Continued)

FOREIGN PATENT DOCUMENTS

CN    1942413 A     4/2007
CN  101053719 A    10/2007
(Continued)

OTHER PUBLICATIONS

Benbow et al., "Paste flow and extrusion", Oxford series on advanced manufacturing, Oxford, 1993, pp. 153.
(Continued)

*Primary Examiner* — David Sample
*Assistant Examiner* — Elizabeth Collister
(74) *Attorney, Agent, or Firm* — Kurt R. Denniston

(57) ABSTRACT

The present disclosure relates to porous ceramic articles and a method of making the same. The porous ceramic articles have a porosity (P) as a fraction in a range of about 0.3 to about 0.7; a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (µm); a tortuosity in a range of about 1.8 to 3; and a median pore size diameter $d_{50}$ in a range of about 10 µm to about 35 µm. The porous ceramic articles can have an interconnected bead microstructure comprising beads and bead connections, PQ is directly proportional to bead size, and wherein in a random cross section through the body, the beads appear as globular portions.

19 Claims, 13 Drawing Sheets

(51) Int. Cl.
    *B01D 53/94*     (2006.01)
    *B01J 35/10*     (2006.01)

(52) U.S. Cl.
    CPC .......... *B01D 53/94* (2013.01); *B01J 35/1076* (2013.01); *B01D 46/24491* (2021.08); *B01D 46/24492* (2021.08); *B01D 2255/9155* (2013.01); *B01D 2279/30* (2013.01)

(56) References Cited

U.S. PATENT DOCUMENTS

| | | | |
|---|---|---|---|
| 4,789,501 | A | 12/1988 | Day et al. |
| 5,173,455 | A | 12/1992 | Terbot et al. |
| 5,406,058 | A | 4/1995 | Lipp |
| 5,545,243 | A | 8/1996 | Kotani et al. |
| 5,863,491 | A | 1/1999 | Wang |
| 5,976,478 | A | 11/1999 | Swanson et al. |
| 6,017,994 | A | 1/2000 | Carter et al. |
| 6,027,684 | A | 2/2000 | Gheorghiu et al. |
| 6,048,199 | A | 4/2000 | Dull et al. |
| 6,080,345 | A | 6/2000 | Chalasani et al. |
| 6,089,860 | A | 7/2000 | Dull et al. |
| 6,207,101 | B1 | 3/2001 | Beall et al. |
| 6,287,509 | B1 | 9/2001 | Gheorghiu |
| 6,325,963 | B1 | 12/2001 | Dull et al. |
| 6,413,895 | B1 | 7/2002 | Merkel |
| 6,551,628 | B1 | 4/2003 | Watson et al. |
| 6,589,465 | B2 | 7/2003 | Kumazawa et al. |
| 6,620,751 | B1 | 9/2003 | Ogunwumi |
| 6,849,181 | B2 | 2/2005 | Ogunwumi et al. |
| 6,932,959 | B2 | 8/2005 | Sterte et al. |
| 7,166,552 | B2 | 1/2007 | Fukuda et al. |
| 7,294,164 | B2 | 11/2007 | Merkel |
| 7,381,681 | B2 | 6/2008 | Nilsson et al. |
| 7,596,885 | B2 | 10/2009 | Adrian et al. |
| 7,727,613 | B2 | 6/2010 | Suwabe et al. |
| 7,732,366 | B2 | 6/2010 | Ohno et al. |
| 7,754,638 | B2 | 7/2010 | Ogunwumi et al. |
| 7,964,262 | B2 | 6/2011 | Brocheton et al. |
| 7,976,768 | B2 | 7/2011 | Brady et al. |
| 7,981,188 | B2 | 7/2011 | Miao et al. |
| 8,038,956 | B2 | 10/2011 | Li |
| 8,101,117 | B2 | 1/2012 | Addiego et al. |
| 8,114,354 | B2 | 2/2012 | Li |
| 8,119,234 | B2 | 2/2012 | Backhaus-Ricoult et al. |
| 8,138,108 | B2 | 3/2012 | Tepesch et al. |
| 8,187,525 | B2 | 5/2012 | Custer et al. |
| 8,394,167 | B2 | 3/2013 | Merkel et al. |
| 8,450,227 | B2 | 5/2013 | McCauley et al. |
| 8,454,887 | B2 | 6/2013 | Likitvanichkul |
| 8,481,900 | B2 | 7/2013 | Pitsakis |
| 8,591,287 | B2 | 11/2013 | Folmar et al. |
| 8,591,623 | B2 | 11/2013 | Beall et al. |
| 8,691,361 | B2 | 4/2014 | Okazaki et al. |
| 8,715,807 | B2 | 5/2014 | Boussant-Roux et al. |
| 8,729,436 | B2 | 5/2014 | Adrian et al. |
| 8,920,705 | B2 | 12/2014 | Suzuki et al. |
| 8,974,724 | B2 | 3/2015 | Day et al. |
| 9,221,192 | B2 | 12/2015 | Beall et al. |
| 9,335,093 | B2 | 5/2016 | Feldman et al. |
| 9,376,347 | B2 | 6/2016 | Backhaus-Ricoult et al. |
| 9,429,361 | B2 | 8/2016 | Harihara et al. |
| 9,452,578 | B2 | 9/2016 | Bronfenbrenner et al. |
| 9,623,360 | B2 | 4/2017 | Backhaus-Ricoult et al. |
| 9,856,177 | B2 | 1/2018 | Miao et al. |
| 9,908,260 | B2 | 3/2018 | Backhaus et al. |
| 2001/0033038 | A1 | 10/2001 | Sakaguchi et al. |
| 2003/0007990 | A1 | 1/2003 | Blankenship et al. |
| 2004/0029707 | A1 | 2/2004 | Beall et al. |
| 2005/0161849 | A1 | 7/2005 | Ohno et al. |
| 2005/0191480 | A1 | 9/2005 | Tao et al. |
| 2007/0119135 | A1 | 5/2007 | Miao et al. |
| 2008/0047243 | A1 | 2/2008 | Beall et al. |
| 2008/0124423 | A1 | 5/2008 | Peterson et al. |
| 2008/0124516 | A1 | 5/2008 | Noguchi et al. |
| 2008/0125305 | A1 | 5/2008 | Day et al. |
| 2008/0237942 | A1 | 10/2008 | Takamatsu |
| 2009/0137382 | A1 | 5/2009 | Merkel |
| 2009/0140452 | A1 | 6/2009 | Derosa et al. |
| 2009/0143219 | A1 | 6/2009 | Chou |
| 2009/0143221 | A1 | 6/2009 | Ogunwumi et al. |
| 2009/0326279 | A1 | 12/2009 | Tonkovich et al. |
| 2010/0237007 | A1 | 9/2010 | Merkel et al. |
| 2010/0298114 | A1 | 11/2010 | Maki et al. |
| 2010/0317508 | A1 | 12/2010 | Maki et al. |
| 2011/0052906 | A1 | 3/2011 | Itoi et al. |
| 2011/0077143 | A1 | 3/2011 | Tohma et al. |
| 2011/0097582 | A1 | 4/2011 | Tohma et al. |
| 2011/0105318 | A1 | 5/2011 | Raffy et al. |
| 2011/0121478 | A1 | 5/2011 | Beall et al. |
| 2011/0124484 | A1 | 5/2011 | Maki et al. |
| 2011/0124486 | A1 | 5/2011 | Gallaher et al. |
| 2011/0130276 | A1 | 6/2011 | Backhaus-Ricoult et al. |
| 2011/0152075 | A1 | 6/2011 | Raffy et al. |
| 2011/0156323 | A1 | 6/2011 | Maki et al. |
| 2011/0236688 | A1 | 9/2011 | Suzuki et al. |
| 2011/0248106 | A1 | 10/2011 | Maki et al. |
| 2012/0096821 | A1 | 4/2012 | Nemoto et al. |
| 2012/0124953 | A1 | 5/2012 | Raffy |
| 2012/0134891 | A1 | 5/2012 | Boger et al. |
| 2012/0198805 | A1 | 8/2012 | Iwasaki et al. |
| 2012/0297830 | A1 | 11/2012 | Backhaus-Ricoult et al. |
| 2013/0111862 | A1 | 5/2013 | Divens-Dutcher et al. |
| 2013/0310247 | A1 | 11/2013 | Linhart et al. |
| 2014/0327186 | A1 | 11/2014 | Cutler et al. |
| 2014/0338296 | A1* | 11/2014 | Backhaus-Ricoult ........... C04B 35/62675 55/523 |
| 2014/0342898 | A1 | 11/2014 | Backhaus-Ricoult et al. |
| 2015/0273727 | A1 | 10/2015 | Noni et al. |
| 2016/0251249 | A1 | 9/2016 | Backhaus-Ricoult et al. |
| 2016/0354760 | A1* | 12/2016 | Suchanek ............. C04B 41/009 |
| 2017/0120498 | A1 | 5/2017 | Brew et al. |
| 2017/0304762 | A1 | 10/2017 | Okazaki |

FOREIGN PATENT DOCUMENTS

| | | |
|---|---|---|
| CN | 101343174 A | 1/2009 |
| CN | 101343175 A | 1/2009 |
| CN | 101495423 A | 7/2009 |
| CN | 101952222 A | 1/2011 |
| CN | 101970377 A | 2/2011 |
| CN | 101977871 A | 2/2011 |
| CN | 102015576 A | 4/2011 |
| CN | 102015579 A | 4/2011 |
| CN | 102131747 A | 7/2011 |
| CN | 102630184 A | 8/2012 |
| CN | 103003220 A | 3/2013 |
| CN | 104208961 A | 12/2014 |
| CN | 105392756 A | 3/2016 |
| CN | 105408283 A | 3/2016 |
| CN | 105473532 A | 4/2016 |
| EP | 506475 A2 | 9/1992 |
| EP | 1207143 A2 | 5/2002 |
| EP | 1284943 A1 | 2/2003 |
| EP | 2319816 A1 | 5/2011 |
| EP | 2322492 A1 | 5/2011 |
| EP | 2335797 A1 | 6/2011 |
| EP | 2401242 A1 | 1/2012 |
| EP | 2402295 A1 | 1/2012 |
| EP | 2043964 B1 | 6/2013 |
| EP | 2266932 B1 | 7/2013 |
| EP | 2038236 B1 | 8/2013 |
| EP | 2999680 A2 | 3/2016 |
| EP | 3026034 A1 | 6/2016 |
| IN | 201105914 P4 | 11/2012 |
| IN | 201107355 P4 | 11/2012 |
| IN | 201107802 P4 | 12/2012 |
| IN | 201202094 P4 | 4/2013 |
| JP | 52-123408 A | 10/1977 |
| JP | 56-089844 A | 7/1981 |
| JP | 04-324799 A | 11/1992 |
| JP | 08-072038 A | 3/1996 |
| JP | 9085030 A | 3/1997 |

(56) References Cited

FOREIGN PATENT DOCUMENTS

| | | | |
|---|---|---|---|
| JP | 11009925 A | 1/1999 |
| JP | 3274027 B2 | 4/2002 |
| JP | 2003040691 A | 12/2003 |
| JP | 2006096634 A | 4/2006 |
| JP | 2009006262 A | 1/2009 |
| JP | 2009-190968 A | 8/2009 |
| JP | 2009-227580 A | 10/2009 |
| JP | 2009-542569 A | 12/2009 |
| JP | 2010001184 A | 1/2010 |
| JP | 2010013293 A | 1/2010 |
| JP | 2010-077008 A | 4/2010 |
| JP | 2010-510959 A | 4/2010 |
| JP | 2010111551 A | 5/2010 |
| JP | 2010111552 A | 5/2010 |
| JP | 2010150054 A | 7/2010 |
| JP | 2010159172 A | 7/2010 |
| JP | 2010189204 A | 9/2010 |
| JP | 2010228935 A | 10/2010 |
| JP | 2011005408 A | 1/2011 |
| JP | 2011005417 A | 1/2011 |
| JP | 2011-504869 A | 2/2011 |
| JP | 2011-506237 A | 3/2011 |
| JP | 4824769 B2 | 11/2011 |
| JP | 2012188346 A | 10/2012 |
| JP | 2013-512189 A | 4/2013 |
| JP | 2015-193497 A | 11/2015 |
| KR | 10-0931755 B1 | 12/2009 |
| PT | 107613 A | 10/2015 |
| WO | 98/43927 A2 | 10/1998 |
| WO | 01/79139 A1 | 10/2001 |
| WO | 2008/005291 A1 | 1/2008 |
| WO | 2008/027219 A2 | 3/2008 |
| WO | 2009/070218 A2 | 6/2009 |
| WO | 2009/070242 A1 | 6/2009 |
| WO | 2009/108299 A1 | 9/2009 |
| WO | 2009/108312 A2 | 9/2009 |
| WO | 2009/119748 A1 | 10/2009 |
| WO | 2009122538 A1 | 10/2009 |
| WO | 2010/024383 A1 | 3/2010 |
| WO | 2010/098347 A1 | 9/2010 |
| WO | 2010/099369 A1 | 9/2010 |
| WO | 2011/150145 A2 | 12/2011 |
| WO | 2012/166222 A1 | 12/2012 |
| WO | 2014/189817 A1 | 11/2014 |
| WO | 2014189740 A1 | 11/2014 |
| WO | 2014189741 A2 | 11/2014 |
| WO | 2015/042499 A2 | 3/2015 |
| WO | 2015/193497 A1 | 12/2015 |
| WO | 2016/138192 A1 | 9/2016 |
| WO | 2017/210251 A1 | 12/2017 |
| WO | 2019/089735 A1 | 5/2019 |

OTHER PUBLICATIONS

Benbow et al., "The extrusion mechanics of pastes—the influence of paste formulation on extrusion parameters", Chemical Eng. Science, vol. 53, 2151, 1987.
Guo Haizhu, "Practical Refractory Materials Handbook"; Beijing; China Building Materials Industry Press, Aug. 2000, p. 421.
Hu Baoyu et al; "Practical Technical Manual for Special Refractory Material"; Beijing: Metallurgical Industry Press, Jun. 2004; pp. 315-317.
Japanese Patent Application No. 2018-561576, Office Action dated Oct. 13, 2020, 10 pages (5 pages of English Translation and 5 pages of Original Document); Japanese Patent Office.
Lyckfeldt et al., "Processing of porous ceramics by 'starch consolidation", Journal of the European Ceramic Society, vol. 18, Issue 2, 1998, pp. 131-140.
Qian Zhirong et al; "Practical Handbook of Refractory Materials"; Beijing: Metallurgical Industry Press, Sep. 1992, p. 169.
Sakar, N., "Thermal gelation properties of methyl- and hydroxypropyl methylcellulose", J. Appl. Polymer Science, vol. 24, 1979, pp. 1073-1087.
Alves et al; "Spray-Dried Powder Granulometry: Influence on the Porous Microstructure of Polished Porcelain Tile"; Bol. Soc. Esp. Ceram. V. 49, 4, 239-246 (2010).
International Search Report and Written Opinion of the International Searching Authority; PCT/US2017/035125; dated Sep. 22, 2017; 11 Pages; European Patent Office.
Sakamoto et al; "Development and Evaluation of Superporous Ceramics Bone Tissue Scaffold Materials With Triple Pore Structure A) Hydroxyapatite, B) Beta-Tricalcium Phosphate"; Bone Regeneration Chapter 13; www.intechopen.com; pp. 301-320.
Wall-Flow Monoliths, Dieselnet Technology Guide Jul. 1, 2004 (Jul. 1, 2004), pp. 1/16.
Yang et al; "In Situ Porous Alumina/Aluminum Titanate Ceramic Composite Prepared by Spark Plasma Sintering From Nanostructured Powders"; Scripta Materials 60 (2009), 578-581.
Japanese Patent Application No. 2018-561576, Office Action dated Jul. 1, 2021, 4 pages (2 pages of English Translation and 2 pages of Original Document), Japanese Patent Office.
Chinese Patent Application No. 201780034051.8, Office Action dated Dec. 25, 2020, 18 pages (English Translation Only); Chinese Patent Office.
Donovan, John W. "Phase transitions of the starch-water system." Biopolymers: Original Research on Biomolecules 18.2 (1979): 263-275. (Year: 1979).
Eskin, NA Michael, and Fereidoon Shahidi. "Biochemistry of foods." (2012). Chapter on Starch Granules by Kequan Zhou and Liangli Yu. (Year: 2012).
Mücksch, Christian, and Herbert M. Urbassek. "Molecular dynamics simulation of free and forced BSA adsorption on a hydrophobic graphite surface." Langmuir 27.21 (2011): 12938-12943 (Year: 2011).

\* cited by examiner

POROUS ARTICLE AND METHOD OF MANUFACTURING THE SAME

CROSS-REFERENCE TO RELATED APPLICATIONS

This application is a national stage application under 35 U.S.C. § 371 of International Patent Application Serial No. PCT/US2017/035125, filed on May 31, 2017, which claims the benefit of priority under 35 U.S.C. § 119 of U.S. Provisional Application Ser. No. 62/343,496, filed on May 31, 2016, the contents of which are relied upon and incorporated herein by reference in their entireties.

BACKGROUND

Field

Exemplary embodiments of the present disclosure relate to porous articles and a method of making the same. Exemplary embodiments of the present disclosure relate to porous ceramic articles having high permeability and a method of making porous ceramic articles using pre-reacted particles.

Discussion of the Background

Cordierite, silicon carbide, and aluminum titanate-based honeycomb bodies have been widely used for a variety of applications including catalytic substrates and filters for exhaust after treatment.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide porous ceramic articles.

Additional features of the disclosure will be set forth in the description which follows, and in part will be apparent from the description, or may be learned by practice of the disclosure.

An exemplary embodiment discloses a porous ceramic body comprising a porosity (P) as a fraction in a range of about 0.3 to about 0.7; a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm); a tortuosity in a range of about 1.8 to 3; and a median pore size diameter $d_{50}$ in a range of about 10 μm to about 25 μm.

Another exemplary embodiment discloses a porous body comprising a connected bead microstructure, comprising beads, wherein in a random cross section through the body, the beads appear as globular portions; bead connections, wherein adjacent beads are connected by the bead connections; and a bead overlap of less than about 0.5, bead overlap being fraction of radial interference between adjacent connected beads, wherein the beads comprise a median bead diameter ($D_{bead}$) in a range of about 20 μm<$D_{bead}$≤50 μm, and a bead diameter distribution ($D_{breadth}$) of less than 100 μm, $D_{breadth}$ being $((D_{90}-D_{10})/D_{50})$.

Another exemplary embodiment discloses a porous body comprising a porosity (P) as a fraction in a range of about 0.3 to about 0.4; a permeability (K) greater than or equal to about $0.017 \cdot P \cdot d_{50}^2$, where $d_{50}$ is the mean pore size in micrometers (μm); a tortuosity in a range of about 2 to 5; and a median pore size diameter $d_{50}$ in a range of about 10 μm to about 35 μm as measured by mercury porosimetry.

It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION OF THE ILLUSTRATED EMBODIMENTS

Figure 1:
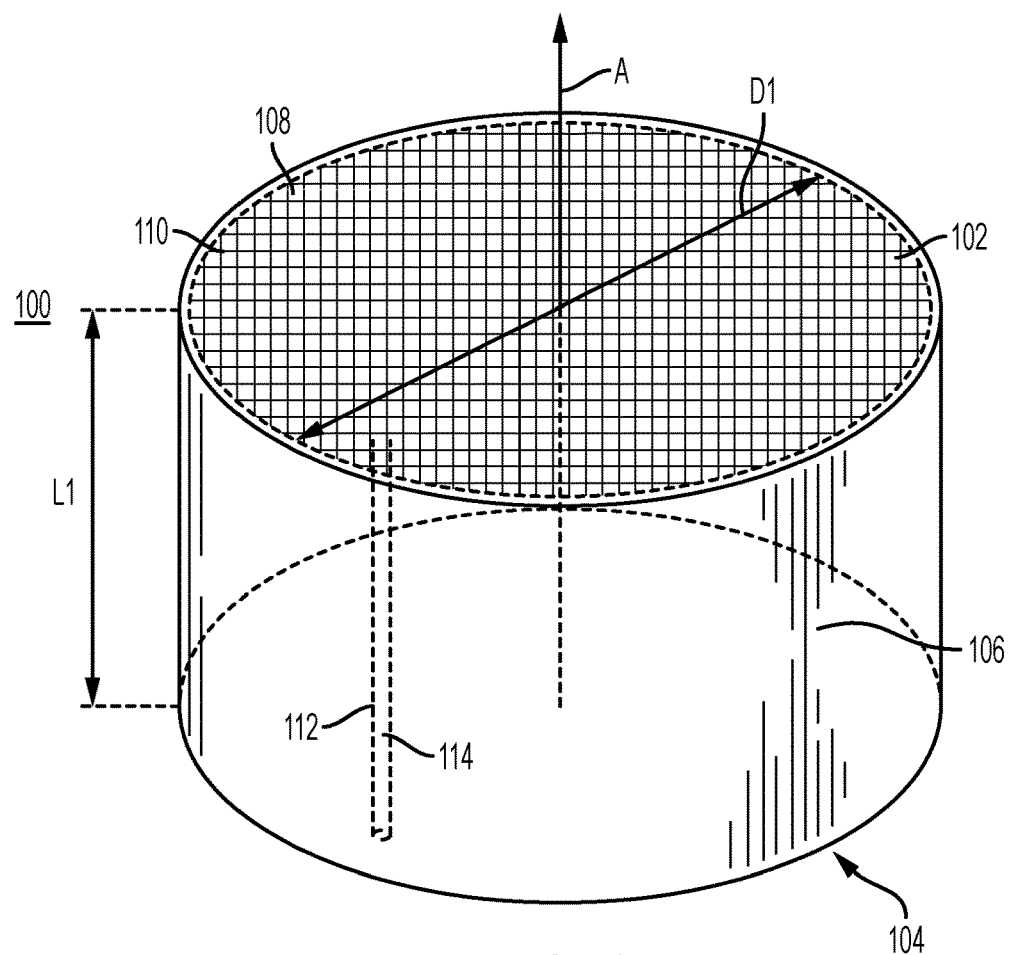
FIG. 1 illustrates a schematic honeycomb body according to exemplary embodiments of the disclosure.

The disclosure is described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure is thorough, and will fully convey the scope of the disclosure to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Exemplary embodiments of the present disclosure relate to a porous ceramic article and the production thereof. The porous ceramic article may be made of aluminum titanate based materials, such as aluminum titanate solid solution (pseudobrookite) as the main phase (greater than 50 vol %) and other phases such as cordierite, feldspar, mullite, spinel, alumina, rutile, corundum, or similar oxides, cordierite, or other oxide or non-oxide ceramics, including metals, intermetallics, glasses, mullite, alumina ($Al_2O_3$), zircon, alkali and alkaline-earth alumino-silicates, spinels, perovskites, zirconia, ceria, yttria, lanthanum oxide, silicon oxide ($SiO_2$), silicon nitride ($Si_3N_4$), silicon aluminum oxynitride (SiAlON), and zeolites. Application of the porous ceramic article may include, for example, honeycomb integrated and non-integrated diesel and gasoline catalyst supports, substrates, and particulate filters. Exemplary embodiments of the present disclosure also relate to a porous ceramic article and batch compositions including pre-reacted particles, and a process for making the porous ceramic article by using at least one batch material in the form of pre-reacted particles.

The pre-reacted particles may be of selected composition, structure, size, and size distribution to impose a reaction path and microstructure development during reactive firing of the porous ceramic article. The pre-reacted particles may be fully reacted prior to firing of the porous ceramic article and merely connect to one another by fusing, bonding, and the like such as with a reactive component or without additional reactive components.

The porous ceramic article produced with the pre-reacted particles may have an engineered pore distribution and phase distribution, which may be referred to herein as the pore network structure and the microstructure. The microstructure may be characterized by phases within the solid matter and the microstructure may be characterized by the shape of the matter and the shape of the pores within the ceramic article. Generally, the microstructure is characterized by matter and pore channels of random two-dimensional cross sections through the three dimensional structure. The porous ceramic article made from the pre-reacted particles may have a "normal" porosity of small pore necks and large matter necks or "inverse" porosity of large pore necks and small matter necks with large pore size in the final, fired ceramic. Pore necks may be considered the channels connecting pores. In microstructures having pores created by fugitive pore formers, the pores are generally spherical or other shape with small connecting channels where the pores intersect one another, as an example of normal porosity with small pore necks. On the other hand, in microstructures having pre-reacted spheroidal particles forming the microstructure, pores may be formed by particle packing between the particle material as an example of inverse porosity with large pore necks. In the latter case, the pore channels are wider and show less constriction for gas flow. Additionally, fugitive pore formers may further open these inter-particle spacings.

The porous ceramic article having the pre-reacted particles according to an exemplary embodiment of the present disclosure provides improved diesel particulate filter (DPF), gasoline particulate filter (GPF), catalyst support, substrate, and combined substrate particulate filter product properties compared to porous ceramic articles made from powder batches without pre-reacted particles. Porous ceramic articles made from batches with pre-reacted particles exhibited large pore size and high porosity, good strength and low coefficient of thermal expansion (CTE) that enable, low pressure drop at higher washcoat and catalyst loading. Thus, exemplary embodiments of the present disclosure enable integration of high selective catalytic reduction (SCR) catalyst loading and high de-$NO_x$ catalyst efficiency at low pressure drop, high filtration efficiency, and good thermal shock resistance.

FIG. 1 illustrates a schematic honeycomb body 100 according to exemplary embodiments of the disclosure. The honeycomb body 100 has a length L1, volume V1, and includes a first end face 102 and a second end face 104 having an outer peripheral surface 106 extending from the first end face 102 to the second end face 104. A plurality of intersecting walls 108 that form mutually adjoining channels 110 extending in the axial direction "A" between opposing end faces 102, 104, according to exemplary embodiments of the disclosure, form a honeycomb matrix. Intersecting walls 112 forming a channel 114 extending between the end faces 102, 104 are shown for illustration. The axial direction is indicated by arrow "A" and a maximum cross sectional dimension perpendicular to the axial direction is indicated by "D1". For example, when the honeycomb body 100 is a cylinder shape, the maximum dimension "D1" may be a diameter of an end face. For example, when the honeycomb body cross section perpendicular to the axial direction is a rectangular shape, the maximum dimension "D1" may be a diagonal of an end face. The top face 102 refers to the first end face 102 and the bottom face 104 refers to the second end face 104 of the honeycomb body 100 positioned in FIG. 1, otherwise the end faces are not limited by the orientation of the honeycomb body 100. The top face 102 may be an inlet face and the bottom face 104 may be an outlet face of the honeycomb body 100. The outer peripheral surface 106 of the honeycomb body 100 extends axially from the first end face 102 to the second end face 104.

Cell density of the honeycomb body 100 can be between about 70 and 1200 cells per square inch (cpsi) (between about 10 and 190 cells per square cm). Typical cell wall thicknesses can range from about 0.025 mm to about 1.5 mm (about 1 to 60 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. As used herein, honeycomb body 100 is intended to include a generally honeycomb structure but is not strictly limited to a square structure. For example, hexagonal, octagonal, triangular, rectangular, or any other suitable cell shape, and combinations thereof may be used. Also, while the cross section of the cellular honeycomb body 100 is circular, it is not so limited, for example, the cross section can be elliptical, square, rectangular, or other desired shape, and a combination thereof.

For ease of description, the exemplary embodiments refer to honeycomb body, but the disclosure is not so limited, for example, trough filters and radial flow filters are also included in this disclosure.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies of high strength and thermal durability having channels extending axially from a first end face to a second end face. In this sense, ceramic powder batch mixtures, ceramic pre-cursor batches, or ceramic batch compositions may comprise inorganic oxides or oxide precursors that when reacted form a ceramic, as well as ceramics that remain unreacted or react to form another ceramic in whole or in part.

Upon exiting the extruder in an axial direction, the batch stiffens into a wet extrudate comprising the network of axially extending intersecting walls (webs) that form the axially extending channels and axially extending outer peripheral surface as described above. Disposed at the outer periphery of the matrix is the outer peripheral surface. The outer peripheral surface may be referred to herein as a co-extruded skin, an integrally formed co-extruded skin, or skin. A green ware honeycomb body or porous ceramic honeycomb body extruded with the skin on the matrix is referred to herein as an extrude-to-shape honeycomb body. As used herein a ceramic honeycomb body includes ceramic honeycomb monoliths and ceramic segmented honeycomb bodies.

A co-extruded or an after-applied exterior skin may form the outer peripheral surface extending axially from the first end face to the second end face of the ceramic honeycomb body. Each channel of the honeycomb body defined by intersecting walls (webs), whether monolithic or segmented, can be plugged at an inlet face or an outlet face to produce a filter. When some channels are left unplugged a partial filter can be produced. The honeycomb body, whether monolithic or segmented, can be catalyzed to produce a substrate. A non-plugged honeycomb body is generally referred to herein as a substrate. The catalyzed substrate can have an after applied catalyst or comprise an extruded catalyst. Further, filters and partial filters can be catalyzed to provide multi-functionality. The ceramic honeycomb bodies thus produced are widely used as catalyst supports, membrane supports, wall-flow filters, partial filters, and combinations thereof for cleaning fluids such as purifying engine exhausts.

Figure 2A:
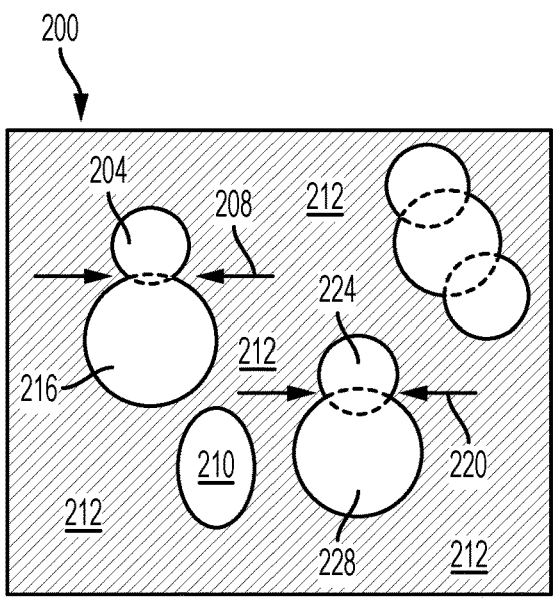
FIG. 2A is a schematic diagram of a cross section through a porous ceramic article showing a regular porosity microstructure with narrow pore necks and FIG. 2B is a schematic diagram of a cross section through a porous ceramic article showing an inverse porosity microstructure with large pore necks according to an exemplary embodiment of the disclosure.
Figure 2B:
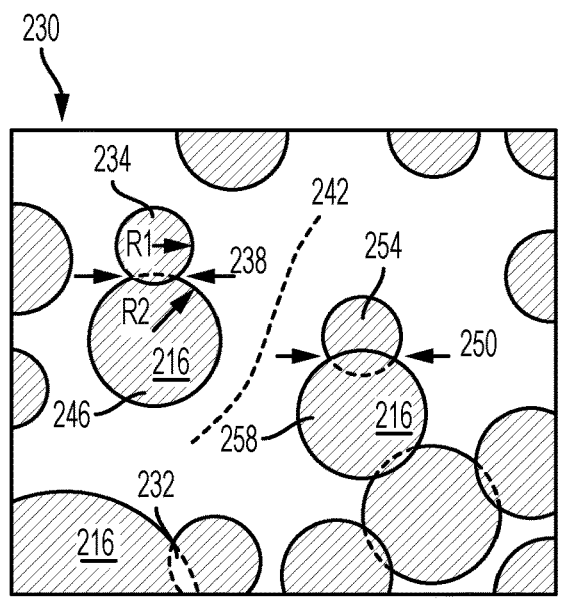

FIG. 2A is a schematic diagram of a cross section through a porous ceramic article showing a regular porosity microstructure with narrow pore necks and FIG. 2B is a schematic diagram of a cross section through a porous ceramic article showing an inverse porosity microstructure with large pore necks according to an exemplary embodiment of the disclosure. In porous ceramic precursor batches a pore former may be included. Pore formers may include graphite, polymer spheres, starches, and the like. During firing, the pore former is burned out leaving a pore in the fired porous ceramic article. During this burnout of the pore former, gases may need to escape from the article, while some reactants may be left behind as part of the solid matter of the final article. Exothermal and endothermal firing events due to dehydration, burn out and other transformations may require slow firing to avoid cracking of the article.

FIG. 2A demonstrates that regular porosity 200 with narrow necks 208, 220 between solid matter 212 may result in high pressure drop, as may be obtained from firing unreacted powders with fugitive pore former. The solid matter 212 may be multiphase, multicomponent, and microcracked, or a single phase with no microcracks. The pore microstructure generally resembles the shape and arrangement of the fugitive pore former that was burned out during firing of the article. The pore network 200 through which gases travel during in-service consists of pores 204 and the connection between pores. These connections may be referred to as pore necks 208. Fluids, such as exhaust gases, may be cleaned as they travel through the pore network 200. Pore neck 208 may cause flow restriction as the fluid flows from pore 204 to pore 216 through the pore neck 208. Small pore necks 208 may lead to a high pressure drop for a porous ceramic article or a honeycomb filter. Additionally, some pores, for example, pore 210, may not be interconnected with the pore network.

Large pore necks 220 may lead to a lower pressure drop than small or narrow pore necks 208. Large pore neck 220 connects pore 224 to pore 228 in FIG. 2A. FIGS. 2A and 2B are schematics of random cross sections (two-dimensional) through three-dimensional structures such that pores 204, 216, 224, and 228 may be connected in the pore network 200 even though pores 204 and 216 are shown as spaced apart from pores 224 and 228 by material 212 in the two-dimensional cross section schematic. Structures made from reactive batch materials with fugitive pore formers may also exhibit a lower surface porosity than the bulk porosity.

Inverse porosity with large pore necks between matter as can be obtained by sintering reacted spherical batch particles (spray-dried pre-fired particles), referred to herein as beads, in a final firing process with or without a fine, low temperature binder 232 is demonstrated in FIG. 2B. Small necks may limit permeability and gas flow and control the pressure drop. Materials with large necks in the pore structure produce improved permeability and thus provide low pressure drop filters. FIG. 2B illustrates a random cross section of an inverse pore network 230 microstructure. Pre-reacted particles form a sinter-bonded or reaction-bonded porous ceramic article. Matter 212 includes shapes generally resembling spheroidal, pre-reacted particles (beads) such as shape 234 joined to shape 246 at matter neck 238. The matter 212 in FIG. 2B comprises an interconnected bead microstructure comprising bead portions and bead connection portions wherein adjacent bead portions are connected by the bead connection portions. In a random cross section through the body, the bead portions appear as globular. Structures comprising engineered pore structures according to exemplary embodiments of the disclosure exhibit higher permeability at same porosity and median pore size compared to structures comprising pores formed with fugitive pore formers.

In an inverse porosity microstructure, the matter 212 appears in a cross-sectional two-dimensional (2D) view as islands surrounded by irregularly shaped pores in contrast to the microstructure of FIG. 2A. In the normal porosity microstructure, the pores 204, 216 and 224, 228 appear in a 2D cross sectional view as islands surrounded by irregularly shaped matter 212 as shown in FIG. 2A.

The sintering reacted spherical batch particles (spray-dried pre-fired particles) referred to herein as pre-reacted particles or beads 312 can be connected into bead-built microstructure. The bead-built microstructure (interconnected bead microstructure) matter can appear as connecting portions and bead portions (globular, spherical, round, circular, bulbous, orbed, lobed portions) when the structure is viewed on a random plane section through the structure. The interconnected bead microstructure comprises bead portions and bead connection portions wherein adjacent bead portions are connected by the bead connection portions. In a random cross section through the body, the bead portions appear as globular. The globular portions are interconnected. The interconnections can be a binder material or fused portions of the globular portions. The globular portions can be circular, or a circle with surface features. The globular portions can be merged at the connection portions by overlap or protrusions. The globular portions can be multi-lobed, fusion bonded or neck bonded to adjacent globular portions.

Figure 3:
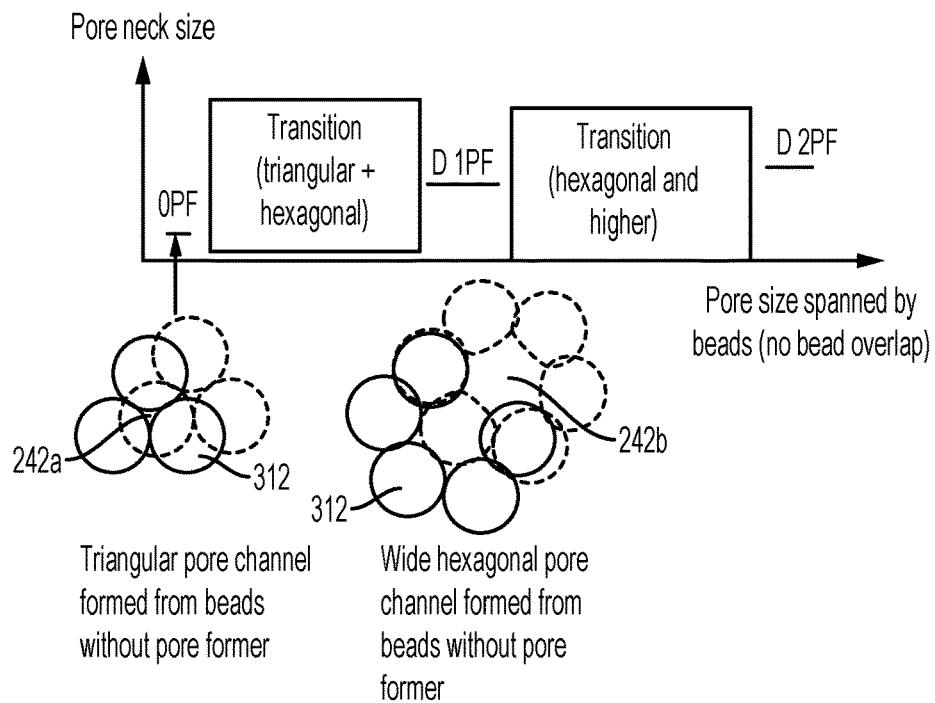
FIG. 3 shows bead-built structures with wide pore necks 242a triangular channels without any pore former, mixtures of triangular channels and wide hexagonal channels 242b and increasing hexagonal channel fraction with increasing pore former and large flow channels.

FIG. 3 shows interconnected bead microstructure of bead-built structures formed without any fugitive pore former with wide pore necks 242a of triangular channels, and mixtures of triangular channels 242a and wide hexagonal channels 242b and increasing hexagonal channel fraction with increasing pore former and large flow channels. The bead-built structures are composed of spherical portions of interconnected beads and when randomly sectioned the spherical portions appear as generally circular portions (globular). Hexagonal channels at higher porosity are shown when pore former particles are contoured by a ring of pre-reacted spherical bead inorganic particles. Six nearest neighbors are shown, but the number depends on the pore former size to bead size ratio. The permeability in absence of pore former will be determined by the triangular channels; addition of pore former will create more porosity and hexagonal surrounded pore former arrangements such that hexagonal channels will contribute to the porosity. Thus, with increasing porosity/pore former level, the permeability will transition through a mixture of triangular and hexagonal channel contributions to a permeability that is then given exclusively by hexagonal channels and, for even higher pore former level, contain channels made from larger rings with several pore former particles per ring. Thus the permeability curve starts at a non-zero level corresponding to triangular channels and increases rapidly with contribution of larger channels.

Figure 4:
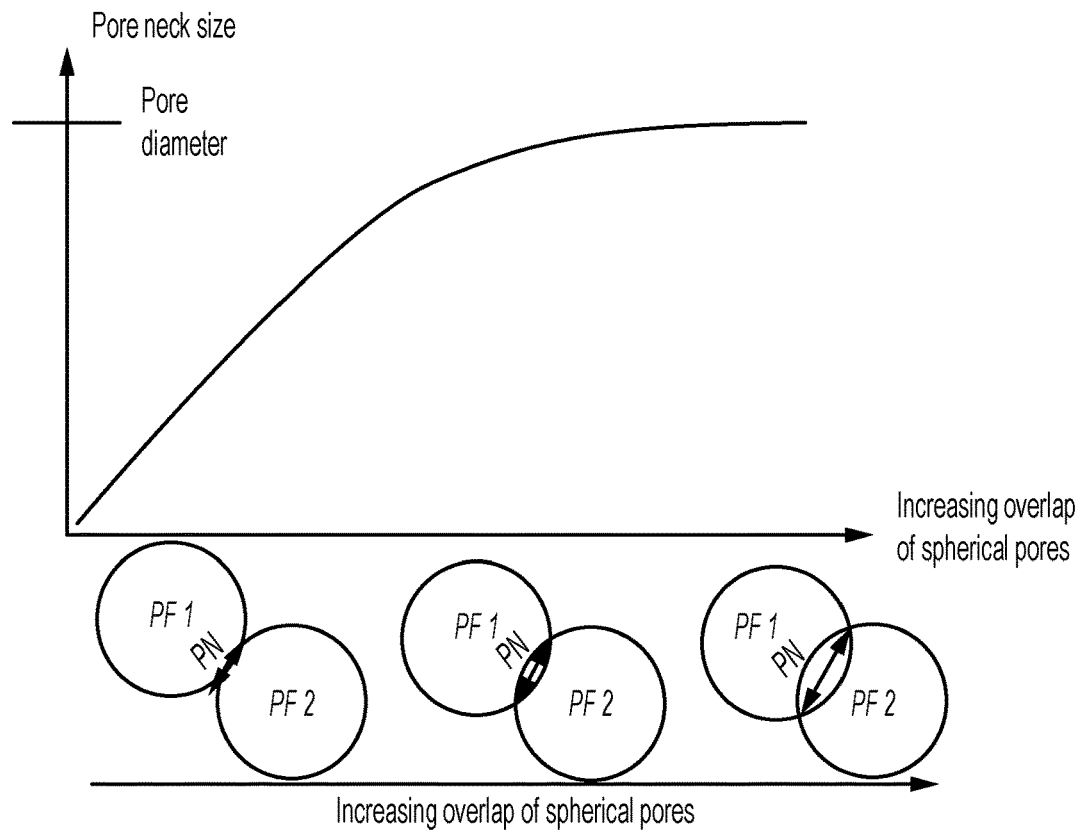
FIG. 4 is a schematic showing increase in pore neck area with increase in pore overlap of two pores PF1 and PF2 and a corresponding representative curve. An increase in amount of pore former can provide more pore overlap.

In contrast, in traditional structures of microstructures comprising pores formed with fugitive pore formers and reactive constituents, the permeability of the structure in an absence of pore former or for low levels of pore former is zero until continuous interconnected pore channels are achieved. The permeability then increases with the pore neck size, as demonstrated in FIG. 4 from 0 to a maximum that is given by the size of the pore diameter (pore former particle diameter). FIG. 4 is a schematic showing increase in pore neck area with increase in pore overlap of two pores, PF1 and PF2, and a corresponding representative curve. An increase in amount of pore former can provide more pore overlap.

Structures comprising engineered pore microstructures according to exemplary embodiments of the disclosure exhibit higher permeability at a same porosity and median pore size compared to structures comprising pores formed with fugitive pore formers and reactive constituents. The structures that exhibit this improved permeability comprise beads that are bonded at their contact points to form a three-dimensional (3D) structure and sintered. As sintering times and/or temperatures increase, bead overlap increases. Bead overlap, dR, (sphere overlap) refers to fraction of radial interference between adjacent connected beads. For example, as shown in FIG. 2B, bead 234 may have a radius R1 and bead 246 may have a radius R2. The bead overlap, dR, refers to the matter neck 238 where R1 and R2 interfere with each other. The permeability advantages of such bead-built structures according to exemplary embodiments are shown herein on experimentally processed materials and on computer-generated pore structures.

These structures according to exemplary embodiments of the disclosure are reconstructed by spheroids with less than 20% deviation in their aspect ratios from a perfect sphere with constant diameter, with less than 25% overlap of the individual spheroids, at least 90% of the spheroidal particles have a diameter of at least 20 µm and 90% of the spheroid diameters are more than 20 µm and less than 50 µm. In contrast, traditional material microstructures cannot be reconstructed by spheres with either such narrow particle size distribution, such small sphere overlap and/or lack of fraction of small spheres.

Computer-generated bead-built microstructures according to exemplary embodiments were derived for a large variation of input parameters, such as bead size, bead overlap, resulting material porosity and median pore size. Variables for experimentally attained materials according to exemplary embodiments were bead size, width of the bead size distribution and overlap of the beads, which was varied through sintering temperature, sintering time, and sinter aids. Computer-generated and experimental bead-built structures have pore structures that have larger pore necks compared to traditional state of the art microstructures comprising pores formed with fugitive pore formers and reactive constituents.

The bulk and through-wall permeability of experimental materials as determined from tomograms and computer-generated (modeled) structures were evaluated by flow modeling. For experimental materials, porometry and pressure drop were additionally measured. The results show a surprising and unexpected significantly higher bulk permeability and surface permeability of the bead-built pore structures according to exemplary embodiments compared to traditional structures. The bead-built pore structures according to exemplary embodiments also reflect a higher permeability in porometry measurements of experimental materials. The bead-built pore structures according to exemplary embodiments further result in lower filter pressure drop at a same filtration efficiency from material tortuosity. The permeability advantage increases with increasing bead size. The permeability also increases with increasing porosity and median pore diameter. Bead-built materials with the above described permeability advantage according to exemplary embodiments have similar tortuosity and bare filtration efficiency as traditional materials with a same porosity and median pore diameter. Washcoat loaded in-pore homogeneous distribution and inhomogeneous distribution bead-built microstructures according to exemplary embodiments preserve permeability and coated pressure drop advantage compared to the traditional materials.

Modeling Microstructures

A FORTRAN program was developed to generate spherical bead-built microstructures according to exemplary embodiments of the disclosure in a cube volume. The technique was based on geometric constraints without using any physics input. The procedure was as follows: a selected number of bead "nucleation" sites was randomly placed in the defined cube space; the bead nucleation sites were defined as small spheres. The nucleation sites are then "grown" in turn one at a time, by increasing the sphere size each time by one voxel (each of an array of elements of volume that constitute a notional three-dimensional space), taking into account sphere overlap and maximum sphere size; this process was repeated many times until a microstructure of the overlapping beads was formed. The input parameters were number of nucleation seeds, possible spheres overlap, and maximum sphere diameter.

Figure 5A:
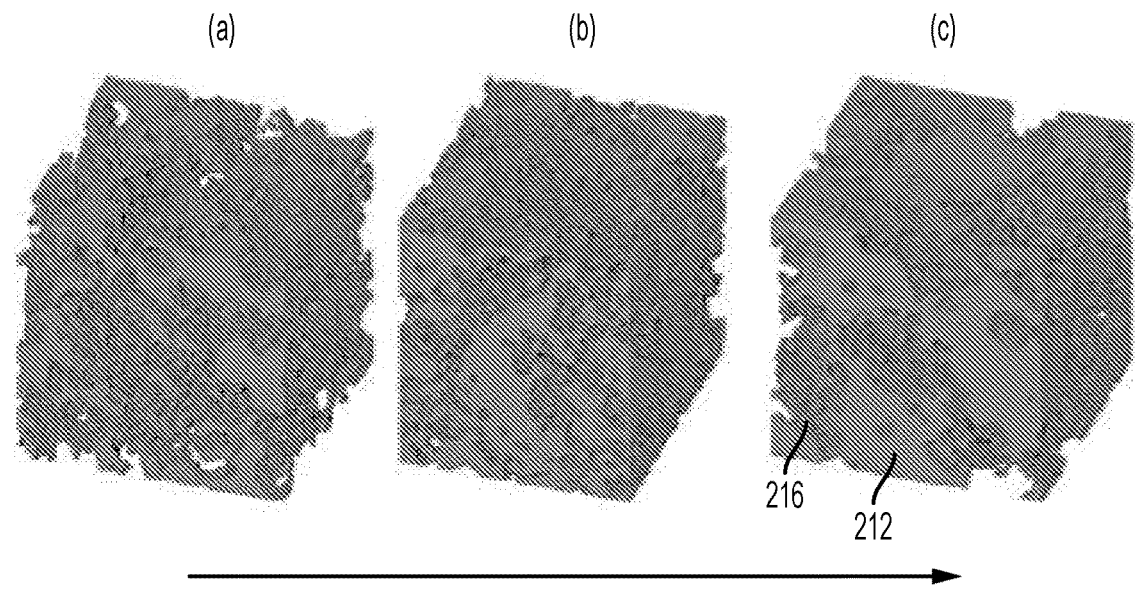
FIG. 5A shows computer-generated images from a computer model of traditional microstructures of continuous matter with spherical pores and overlapping spherical pores at three different porosities decreasing from (a) to (c).
Figure 5B:
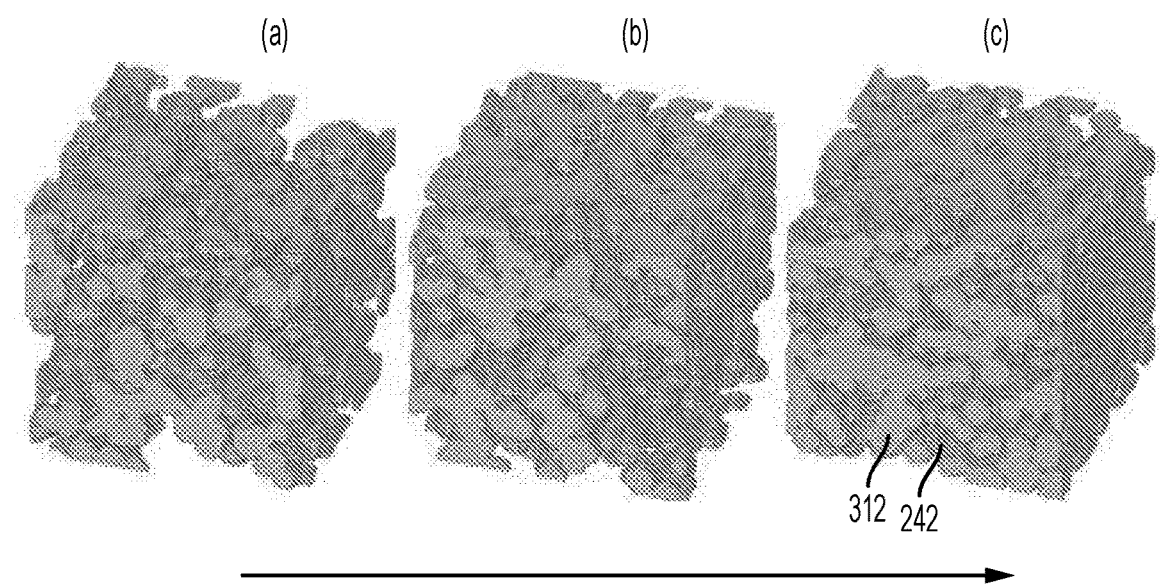
FIG. 5B shows computer-generated images from the computer model of microstructures according to exemplary embodiments of the disclosure with overlapping spheres at three different porosities due to increasing bead overlap from (a) to (c) and corresponding decrease in porosity.

FIG. 5A shows computer-generated images from a computer model of traditional microstructures with overlapping spherical pores at three different porosities decreasing from (a) to (c). FIG. 5B shows computer-generated images from the computer model of microstructures according to exemplary embodiments of the disclosure with overlapping globular particles generating microstructures at three different porosities due to increasing bead overlap from (a) to (c) and corresponding decrease in porosity.

Experimental Microstructures

Figure 6A:
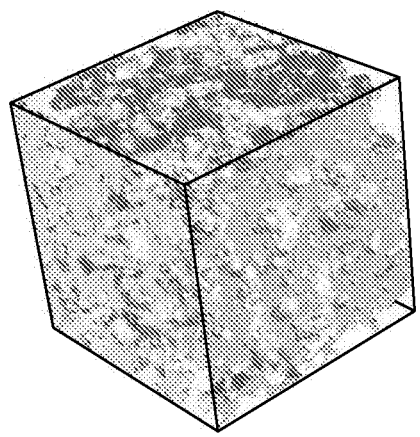
FIG. 6A is an experimental result showing a three-dimensional (3D) tomogram of a microstructure of the traditional type derived from a reactive aluminum titanate ceramic batch according to a comparative example.
Figure 6B:
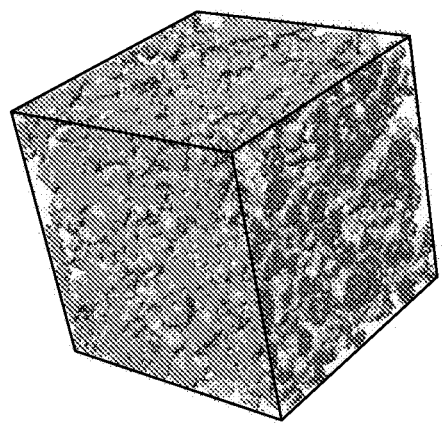
FIG. 6B is an experimental result showing a three-dimensional (3D) tomogram of a microstructure obtained according to exemplary embodiments of the disclosure with overlapping globular particles.

FIG. 6A is an experimental result showing a three-dimensional (3D) tomogram of a microstructure of the traditional type derived from a reactive aluminum titanate batch according to a comparative example. FIG. 6B is an experimental result showing a three-dimensional (3D) tomogram of a microstructure according to exemplary embodiments of the disclosure with overlapping globular particles for the same chemical composition and same phase composition.

For all structures, independent of their origin (e.g., tomograms of experimental materials and computer generated structures) the same procedure was used to determine their permeability. FIG. 6A is a 3D tomogram of the microstructure of a DURATRAP® (CORNING INCORPORATED) aluminum-titanate (AT) material. FIG. 6B is a 3D tomogram of a material with a bead-built microstructure that was made from spray-dried, pre-reacted Cordierite Mullite Aluminum Titanate (CMAT) spheres according to exemplary embodiments of the disclosure.

Analysis of the tomograms and computational fluid dynamics (CFD) mesh generation was conducted as follows. The acquired 3D tomograms of a microstructure at 1.4 µm/voxel were composed of a set of about 1000 greyscale images. A commercial software package SimpleWare ScanIP and a set of self-developed tools were used to convert the set of images to a 3D mesh. Typical grayscale histograms of bead-built and traditional microstructures were different. However, for all analyses, the same thresholding procedure was used to distinguish porosity and matter.

Figure 7A:
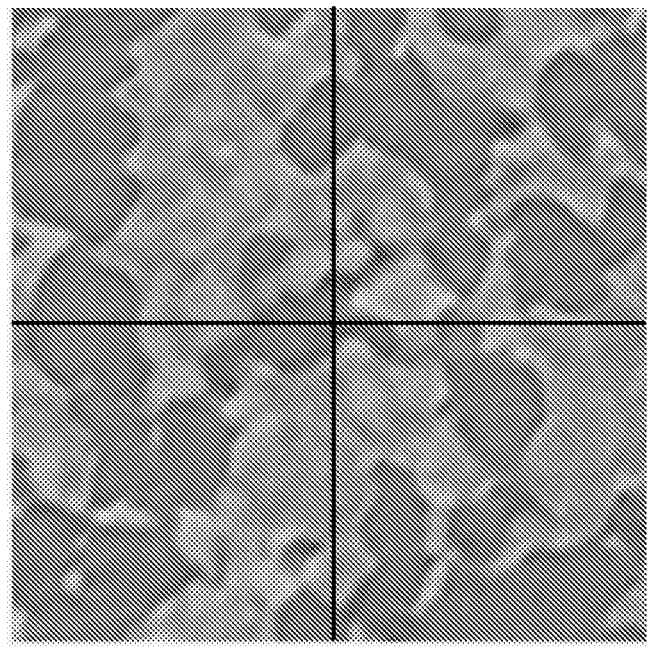
FIG. 7A is a tomography slice of a comparative example with traditional type microstructure derived from a reactive aluminum titanate batch material.
Figure 7B:
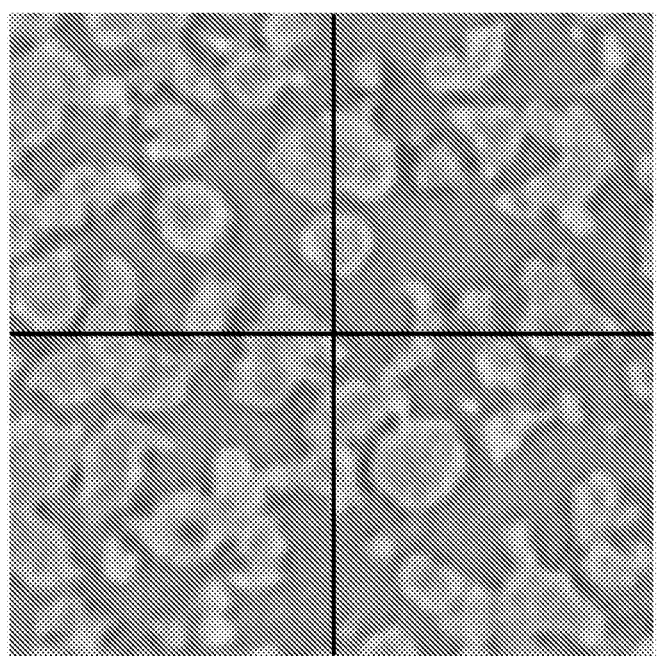
FIG. 7B is a tomography slice of a bead-built (overlapping spherical particles) microstructure according to exemplary embodiments of the disclosure.

FIG. 7A is a tomography slice of a comparative example with traditional type microstructure derived from a reactive aluminum titanate batch material. FIG. 7B is a tomography slice of a microstructure of overlapping globular particles (bead-built) material according to exemplary embodiments of the disclosure.

Permeability computation in generated and tomography-based microstructures.

Techniques were used to characterize and compare the various artificial and real material microstructures and pore structures, such as Mercury Infiltration Porosity measurement (MIP), porometry measurements, pressure drop measurements and flow modeling on 3D tomograms of filter walls and through computer-generated microstructures.

The open source computational fluid dynamics (CFD) software OpenFoam was used for analysis of the complex flow in the porous structure and determination of permeability in digitized tomogram microstructures. A mesh generator allowed for rapid construction of a structured mesh of the digitized microstructure pore space. A pressure differential was imposed on opposing faces of the selected microstructure 3D unit. Slip/Symmetry boundaries were specified on the remaining four bounding faces of the model domain. The complex flow and velocity components throughout the pore space were determined using the total flow-rate along with the geometry, pressure drop and viscosity. The permeability was derived using Darcy's Law. Thus, three different permeability values in the three directions of an applied pressure gradient were determined. The permeability value for a microstructure pore space was determined by averaging the three different permeability values in the three directions of the applied pressure gradient. Depending on the selected 3D microstructure unit and flow direction, bulk permeability and across wall permeability were derived. Of special interest was the across wall permeability that determines the pressure drop in a honeycomb body.

During mercury infiltration, mercury is pushed under increasing pressure into the pore structure and the amount of infiltrated mercury is determined as function of pressure. The amount of mercury infiltrated at a given pressure depends on the size of the pores and pore necks and the interconnectivity of the pores. In examples, samples of size 10 mm×20 mm×20 mm were used. Using a standard algorithm, porosity, median pore size and bulk permeability were derived from the infiltration curve.

Porometry was measured on 2"×2"2 cells thick plates that were glued into a frame in a pressured gas conduit and the pressure drop across the plate was measured. For 1" extruded parts, two extruded slabs were glued together to reach the required plate size. The experimental data were converted into permeability.

Tomograms were acquired on 10 mm×10 mm×1 single wall volumes. Simpleware ScanIP software was used. For the first tomogram, the threshold was setup manually, for other tomograms the same values were used.

Pressure drop was measured on 2" diameter, 6" long honeycomb parts that were plugged in checker board pattern. The parts were mounted in a pressure drop set up and pressure drop was measured at different gas flow rates. Pressure drop was measured on bare parts. Pressure drop was also measured on soot-loaded structures.

Example 1

Permeability/flow properties for computer-generated sphere-built (bead-built) microstructures (with continuous pores and spherical matter) according to exemplary embodiments and comparative traditional microstructures (with continuous matter and spherical pores).

TABLE 1

| Porosity in % | D50 in μm | Tortuosity | Permeability in m2 | porosity*D50 (in μm)^2 | Permeability in Darcy |
|---|---|---|---|---|---|
| 200 beads, mean bead size 20 μm | | | | | |
| 61.62 | 19.95 | 1.71 | 1.06E−11 | 24528 | 10.74 |
| 61.25 | 20.38 | 1.74 | 9.28E−12 | 25443 | 9.40 |
|  | 19.19 | 1.73 | 8.00E−12 | 22318 | 8.11 |
| 60.66 | 18.78 | 1.71 | 8.39E−12 | 21401 | 8.50 |
| 60.23 | 19.17 | 1.74 | 7.90E−12 | 22141 | 8.01 |
| 60.62 | 19.60 | 1.72 | 9.32E−12 | 23292 | 9.44 |
| 59.06 | 18.78 | 1.78 | 7.87E−12 | 20830 | 7.97 |
| 60.94 | 18.93 | 1.71 | 8.44E−12 | 21836 | 8.55 |
| 62.24 | 20.58 | 1.73 | 1.03E−11 | 26358 | 10.44 |
| 61.52 | 20.67 | 1.72 | 9.30E−12 | 26273 | 9.42 |
| 200 beads, mean bead size 20 μm | | | | | |
| 58.20 | 14.25 | 1.99 | 2.35E−12 | 11823 | 2.38 |
| 57.78 | 14.67 | 2.06 | 2.03E−12 | 12433 | 2.06 |
| 56.86 | 14.82 | 2.27 | 2.45E−12 | 12493 | 2.48 |
| 57.40 | 14.36 | 2.13 | 2.25E−12 | 11834 | 2.28 |

TABLE 1-continued

| Porosity in % | D50 in μm | Tortuosity | Permeability in m2 | porosity*D50 (in μm)^2 | Permeability in Darcy |
|---|---|---|---|---|---|
| 57.53 | 14.72 | 2.07 | 2.51E−12 | 12461 | 2.54 |
| 57.26 | 14.75 | 2.09 | 2.51E−12 | 12465 | 2.54 |
| 58.64 | 14.75 | 2.08 | 2.81E−12 | 12760 | 2.85 |
| 56.72 | 14.61 | 2.12 | 2.37E−12 | 12099 | 2.40 |
| 56.49 | 14.47 | 2.14 | 2.13E−12 | 11822 | 2.16 |
| 57.82 | 14.30 | 2.06 | 2.42E−12 | 11825 | 2.46 |
| 400 beads, mean bead size 16 μm | | | | | |
| 41.87 | 10.72 | 1.82 | 1.43E−12 | 4815 | 1.45 |
| 41.28 | 10.45 | 1.80 | 1.32E−12 | 4510 | 1.34 |
| 40.96 | 10.12 | 1.80 | 1.37E−12 | 4191 | 1.39 |
| 42.50 | 10.58 | 1.78 | 1.60E−12 | 4756 | 1.63 |
| 40.33 | 9.82 | 1.87 | 1.19E−12 | 3890 | 1.20 |
| 40.09 | 10.28 | 1.91 | 1.25E−12 | 4240 | 1.27 |
| 40.13 | 10.42 | 1.87 | 1.17E−12 | 4357 | 1.19 |
| 41.95 | 10.80 | 1.78 | 1.45E−12 | 4891 | 1.47 |
| 41.88 | 10.41 | 1.85 | 1.36E−12 | 4538 | 1.38 |
| 40.96 | 10.12 | 1.80 | 1.37E−12 | 4191 | 1.39 |
| 300 beads, Mean bead size 14 μm | | | | | |
| 54.62 | 14.56 | 2.17 | 2.30E−12 | 11581 | 2.33 |
| 54.68 | 14.42 | 2.42 | 2.24E−12 | 11374 | 2.27 |
| 54.83 | 14.52 | 2.27 | 1.74E−12 | 11567 | 1.76 |
| 55.46 | 14.61 | 2.22 | 2.33E−12 | 11845 | 2.36 |
| 55.88 | 14.33 | 2.15 | 2.05E−12 | 11468 | 2.07 |
| 56.00 | 14.35 | 2.18 | 2.32E−12 | 11537 | 2.35 |
| 56.19 | 14.54 | 2.15 | 2.20E−12 | 11879 | 2.23 |
| 56.20 | 14.59 | 2.13 | 2.28E−12 | 11969 | 2.31 |
| 56.28 | 14.54 | 2.25 | 2.58E−12 | 11900 | 2.61 |
| 56.30 | 14.68 | 2.28 | 2.51E−12 | 12127 | 2.55 |
| 56.38 | 14.72 | 2.08 | 2.12E−12 | 12212 | 2.15 |
| 56.38 | 14.29 | 2.19 | 2.18E−12 | 11516 | 2.21 |
| 56.46 | 14.07 | 2.24 | 2.40E−12 | 11177 | 2.43 |
| 56.48 | 14.30 | 2.26 | 2.22E−12 | 11546 | 2.25 |
| 56.48 | 14.61 | 2.29 | 2.62E−12 | 12061 | 2.65 |
| 56.49 | 14.47 | 2.14 | 2.13E−12 | 11822 | 2.16 |
| 56.51 | 14.21 | 2.14 | 2.69E−12 | 11408 | 2.72 |
| 56.51 | 14.51 | 2.17 | 2.29E−12 | 11906 | 2.32 |
| 56.53 | 14.51 | 2.13 | 2.32E−12 | 11898 | 2.36 |
| 56.59 | 14.41 | 2.13 | 2.07E−12 | 11745 | 2.10 |
| 56.59 | 14.41 | 2.13 | 2.07E−12 | 11745 | 2.10 |
| 56.61 | 14.03 | 2.20 | 2.27E−12 | 11150 | 2.30 |
| 56.61 | 14.49 | 2.29 | 2.35E−12 | 11894 | 2.38 |
| 56.62 | 13.72 | 2.31 | 2.22E−12 | 10653 | 2.25 |
| 56.63 | 14.14 | 2.03 | 2.30E−12 | 11326 | 2.33 |
| 56.64 | 14.40 | 2.07 | 2.09E−12 | 11737 | 2.11 |
| 56.64 | 14.53 | 2.22 | 2.18E−12 | 11956 | 2.21 |
| 56.65 | 14.10 | 2.16 | 2.69E−12 | 11263 | 2.73 |
| 56.66 | 14.58 | 2.01 | 2.33E−12 | 12041 | 2.36 |
| 56.67 | 14.70 | 2.19 | 2.24E−12 | 12237 | 2.27 |
| 56.68 | 14.69 | 2.22 | 2.45E−12 | 12236 | 2.49 |
| 56.68 | 14.73 | 2.05 | 2.64E−12 | 12293 | 2.68 |

Table 1 is representative data of computer-generated bead-built microstructure according to exemplary embodiments of the disclosure. Table 1 presents pore network characteristics, such as porosity, $d_{50}$, across-wall permeability, bulk permeability and tortuosity that were all derived via model analysis for these exemplary structures.

Figure 8A:
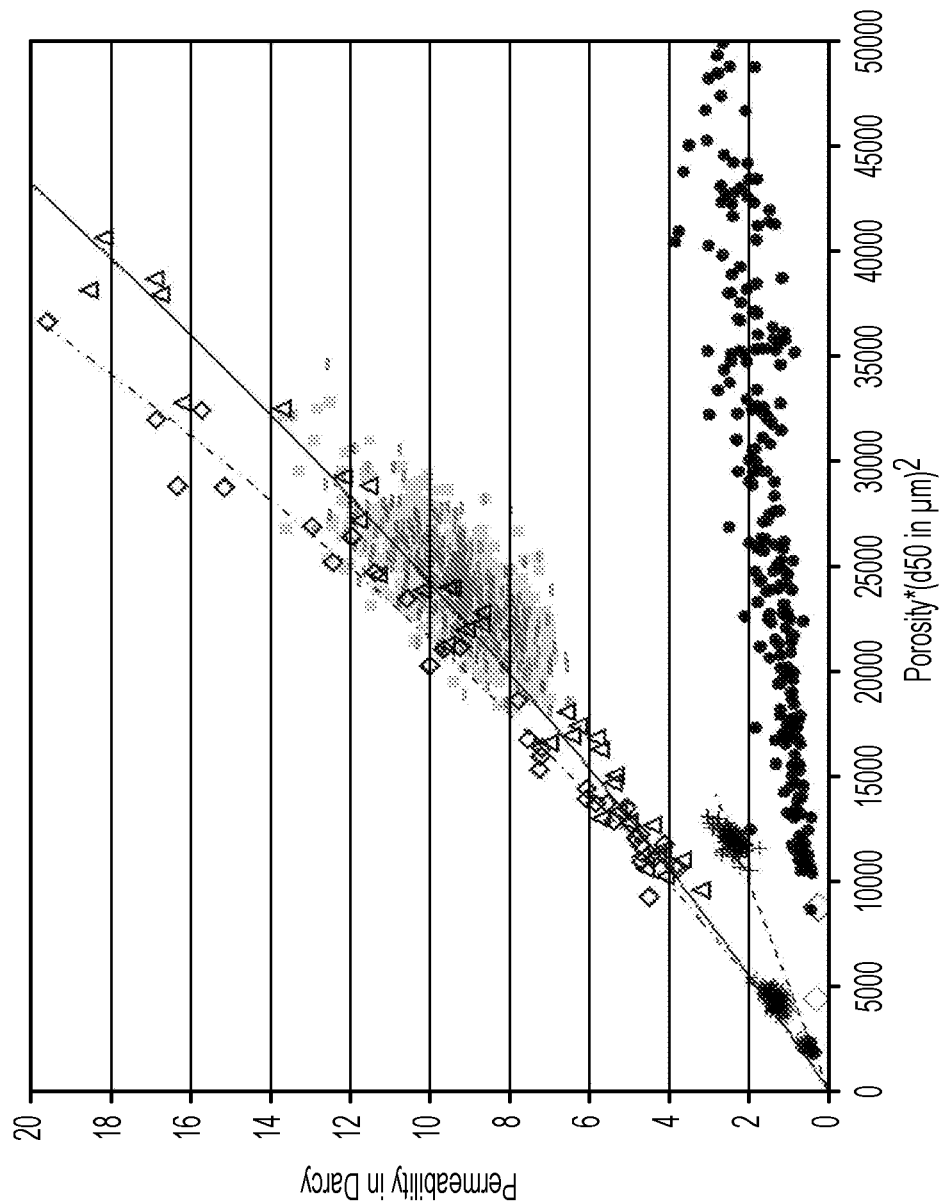
FIG. 8A is a graph of across-wall permeability of computer-generated (modeled) bead-built microstructures according to exemplary embodiments of the disclosure and comparative traditional microstructure with continuous matter and overlapping spherical pores as function of porosity*$d_{50}^2$ as using modeled "mercury infiltration-type" porosity and $d_{50}$.
Figure 8B:
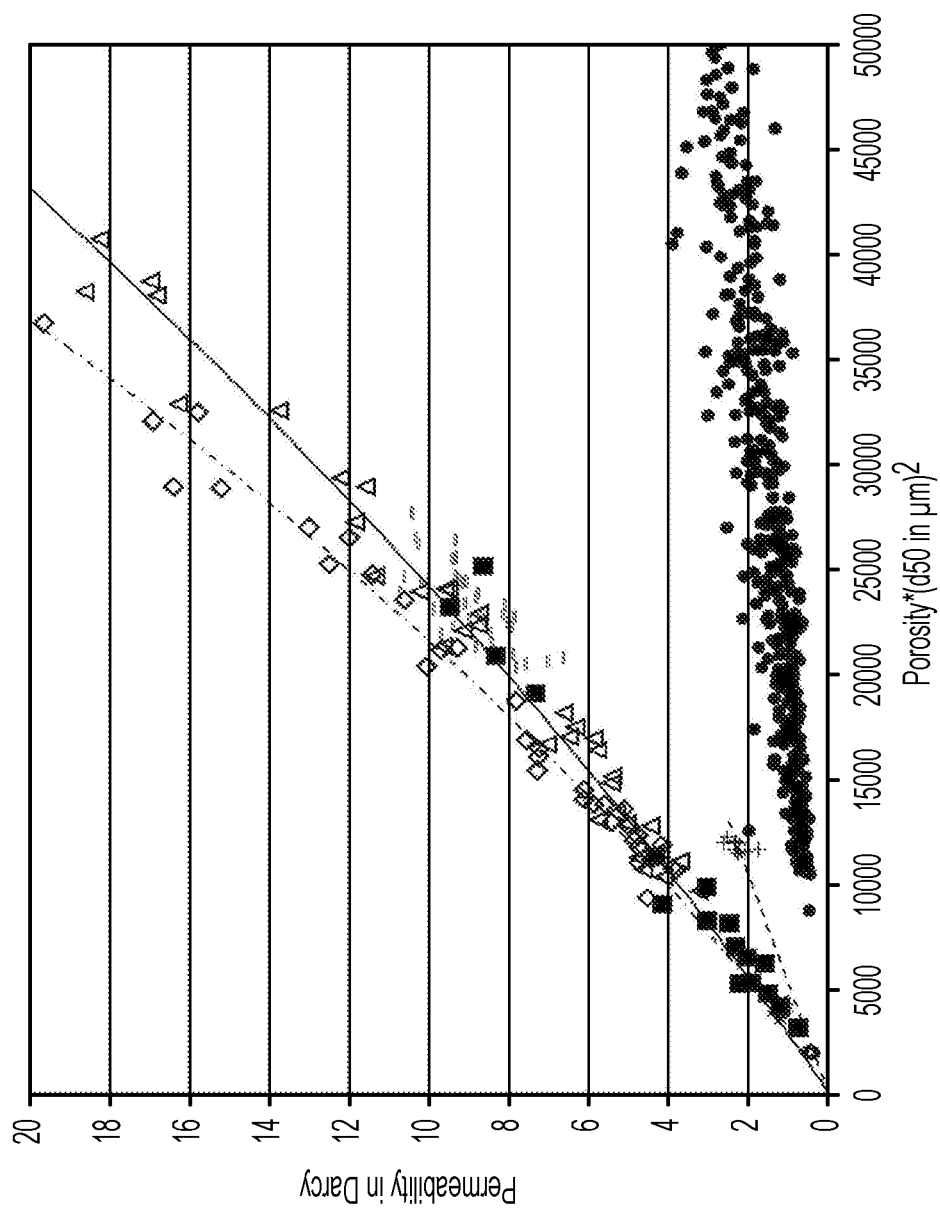
FIG. 8B is the graph of FIG. 8A with experimental data added of overlapping globular particles (bead-built) microstructures according to exemplary embodiments of the disclosure derived from spray-dried particles and traditional type microstructure derived from a reactive aluminum titanate batch material.

FIG. 8A is a graph of bulk (and across-wall) permeability of computer-generated bead-built microstructures according to exemplary embodiments of the disclosure and comparative traditional microstructure with continuous matter containing overlapping spherical pores as function of porosity*$d_{50}^2$ as using modeled "mercury infiltration-type" porosity and $d_{50}$. FIG. 8B is the graph of FIG. 8A with experimental data added of experimentally processed materials with bead-built microstructures according to exemplary embodiments of the disclosure processed from sinter-reacted ceramic spheroidal particles of aluminum titanate composites and comparative traditional type microstructure derived from a reactive aluminum titanate batch material. The bulk and across wall permeability of the microstructures according to exemplary embodiments of the disclosure derived from spray-dried particles are very similar to the modeled bead-built structures according to exemplary embodiments.

Aluminum titanate composite as used herein refers to a composite that contains aluminum titanate, including, for example, aluminum titanate and solid solutions of aluminum titanate, for example aluminum titanate with Mg, Fe, etc., and that crystallizes in the pseudobrookite phase. Other phases of the composite can be cordierite, mullite, spinel, feldspar, glass, corundum, rutile, etc. For example, an aluminum titanate composite can include cordierite mullite aluminum titanate (CMAT) and aluminum titanate compositions as described in U.S. Pat. No. 8,394,167(B2) which is incorporated by reference for all purposes as if fully set forth herein.

FIGS. 8A and 8B show across-wall permeability of computer-generated bead-built microstructures according to exemplary embodiments and traditional microstructure with overlapping spherical pores as function of porosity*$d_{50}^2$ as using modeled "mercury infiltration-type" porosity and $d_{50}$. Traditional microstructures with spherical pores and various pore size, pores size distributions and pore overlap are shown in black solid circles and follow a common trend line (not shown). On the same trend line, inverse porosity, bead-built structures according to exemplary embodiments can be found (open diamond). For inverse porosity bead-built structures according to exemplary embodiments, porosity and matter of bead-built structures have been inversed. All computer-generated bead-built microstructures according to exemplary embodiments show much higher permeability than comparative traditional microstructures.

Several populations of materials were generated with different sets of input parameters. Comparison of monomodal bead-built structures with different bead overlap for unique bead sizes 14 μm (grey cross), 16 μm (open black triangle), 20 μm (open black diamond and star) and 24 μm (black open circle) align on trend lines with the permeability following a square relationship with porosity times squared median pore diameter. The slope of these trend lines increases with increasing bead size. For a same porosity and $d_{50}$, a large increase (almost 100%) in permeability is observed when moving from 14 μm bead size (discontinuous trend line) to 16 μm size (continuous line) and another 20% when moving further to 20 μm bead size. Generated microstructures with broader bead size distribution, 14-24 μm (grey horizontal line symbols) or even broader, 14-50 μm, cluster around the 16 μm monomodal microstructure line. The wider the distribution, the broader spanned is the permeability range when varying bead overlap. The plot demonstrates that bead sizes on the order of the desired median pore diameter are not efficient to produce high permeability for bead-built structures. The permeability increases with the bead size; highest permeability is produced for larger bead size and narrow particle size distribution. Experimental data obtained from tomography analysis of experimental material that were made from spherical reacted ceramic spheroids (black squares) is shown in FIG. 8B.

Example 2

Computer-generated sphere-built microstructures with different sphere sizes and sphere overlap.

The permeability advantage (also referred to herein as permeability factor, PQ) is expressed as permeability/(porosity*$d_{50}^2$) or ($K_{bulk}$)/(P·$d_{50}^2$), $K_{bulk}$ being bulk permeability in Darcy, and $d_{50}$ being the mean pore size in micrometers (μm). Permeability of materials with spherical pore structures scale with (porosity*$d_{50}^2$) with a fixed scaling factor and the advantage of sphere-built (bead-built) structures according to exemplary embodiments is shown by a larger scaling factor. Therefore, the impact of various parameters of bead-built structures according to exemplary embodiments on permeability factor, PQ, is clearly shown.

To study the effect of bead size and bead overlap in such bead-built microstructures according to exemplary embodiments, another set of computer generated bead-built microstructures was generated with different bead size and with different bead overlap. The computer generated bead-built structures include porosity from 40% to 60%, sphere (bead) sizes ranging from 12 to 20 μm diameter and varying sphere overlap. Within the computational resolution of 2 μm voxel resolution, bead overlap <0.1 was within the margin of error of the voxel resolution.

TABLE 2

| scaling pixels | Overlap of spheres | Permeability in Darcy | Porosity | d50 in um | Porosity *d50^2 | permeability/ (porosity*d501^2) | Sphere radius in um | Sphere diameter in um | Tortuosity |
|---|---|---|---|---|---|---|---|---|---|
| 2 um | 0.1 | 1.24 | 0.43 | 8.85 | 3359 | 3.68E−04 | 8 | 16 | 2.068430407 |
| 2 um | 0.1 | 2.43 | 0.51 | 10.64 | 5728 | 4.25E−04 | 8 | 16 | 1.748346712 |
| 2 um | 0.1 | 6.54 | 0.63 | 15.14 | 14342 | 4.56E−04 | 8 | 16 | 1.43158373 |
| 2 um | 0.15 | 6.66 | 0.63 | 15.20 | 14475 | 4.60E−04 | 8 | 16 | 1.422800063 |
| 2 um | 0.2 | 2.51 | 0.51 | 10.43 | 5508 | 4.55E−04 | 8 | 16 | 1.734533643 |
| 2 um | 0.2 | 10.19 | 0.63 | 18.97 | 22836 | 4.46E−04 | 8 | 16 | 1.378797743 |
| 2 um | 0.3 | 4.92 | 0.51 | 16.14 | 13291 | 3.70E−04 | 8 | 16 | 1.632750833 |
| 2 um | 0.35 | 2.59 | 0.43 | 13.66 | 7973 | 3.25E−04 | 8 | 16 | 1.929265536 |
| 2 um | 0.2 | 0.76 | 0.50 | 9.59 | 4628 | 4.91E−04 | 8 | 16 | |
| 2 um | 0.3 | 0.42 | 0.42 | 6.23 | 1630 | 4.71E−04 | 8 | 16 | |
| 2 um | 0.35 | 1.04 | 0.45 | 5.55 | 1402 | 3.79E−04 | 8 | 16 | |
| 2 um | 0.2 | 4.77 | 0.50 | 12.26 | 7558 | 4.87E−04 | 10 | 20 | |
| 2 um | 0.3 | 1.42 | 0.42 | 7.76 | 2524 | 4.71E−04 | 10 | 20 | |
| 2 um | 0.35 | 0.80 | 0.45 | 7.10 | 2289 | 3.79E−04 | 10 | 20 | |
| 2 um | 0.2 | 7.39 | 0.65 | 15.32 | 15167 | 4.27E−04 | 6 | 12 | |
| 2 um | 0.3 | 2.22 | 0.50 | 9.69 | 4727 | 3.88E−04 | 6 | 12 | |
| 2 um | 0.35 | 1.25 | 0.42 | 8.87 | 3302 | 3.26E−04 | 6 | 12 | |

Figure 9:
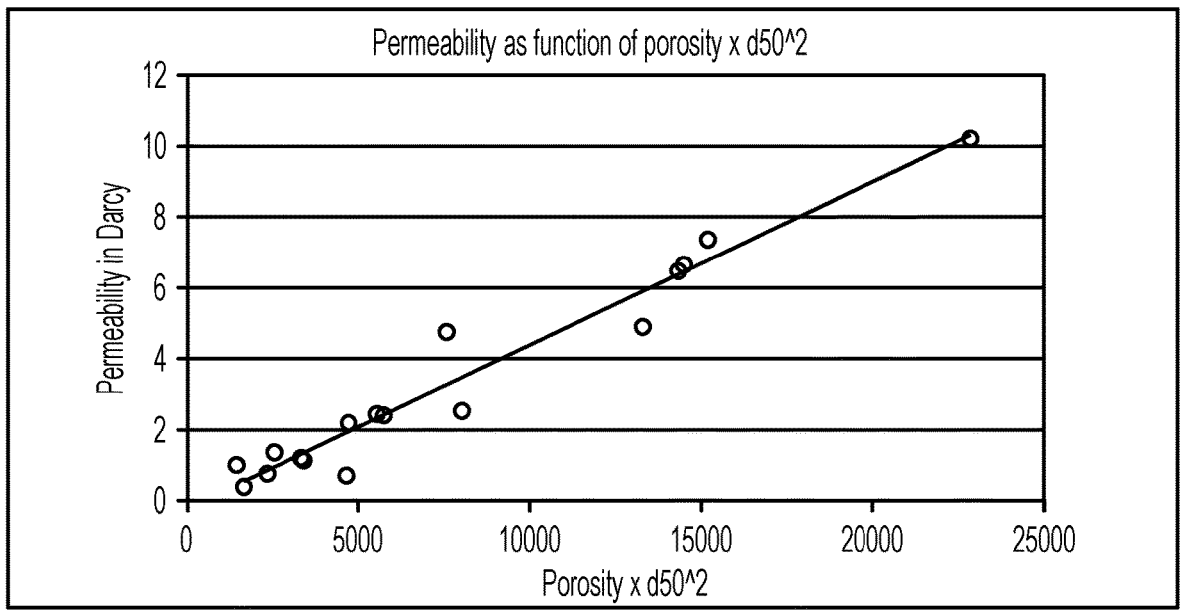
FIG. 9 is a graph of permeability as a function of porosity (P)×median pore size ($d_{50}$) squared, $P*d_{50}^2$, for microstructures according to exemplary embodiments of the disclosure having various bead size and bead overlap.

FIG. 9 is a graph of permeability as a function of porosity (P)×median pore size ($d_{50}$) squared, $P*d_{50}^2$, for microstructures according to exemplary embodiments of the disclosure having various bead size and bead overlap. Beads refer to globular particles (generally spherical) connected or fused together to define the microstructure.

The microstructures according to exemplary embodiments of the disclosure generated from the above effort show increasing permeability with porosity and $d_{50}^2$, and follow a trend over a wide range in porosity and $d_{50}$. The microstructures were built with different bead sizes and different bead overlap and have different porosity and $d_{50}$. The deviations from the trend line can be analyzed to understand the impact of sphere size and sphere overlap. Thus, permeability/(porosity*$d_{50}^2$) equal to a permeability factor, PQ, is considered a microstructure figure of merit for the bulk material for the permeability as determined by flow assessment through the 3D microstructure acquired by tomography of real materials.

Figure 10:
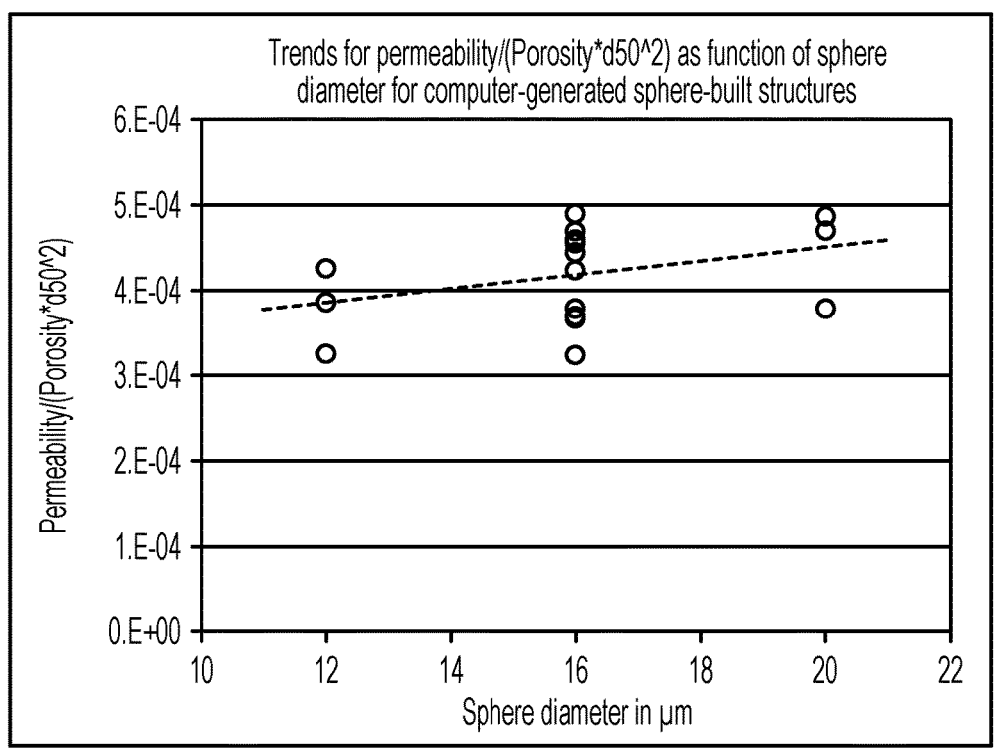
FIG. 10 is a graph of permeability (K) over porosity (P)×median pore size ($d_{50}$) squared, $K/(P*d_{50}^2)$, as a function of sphere diameter (D) according to exemplary embodiments of the disclosure having various porosity, bead size, and bead overlap.

FIG. 10 is a graph of permeability (K) over porosity (P)×median pore size ($d_{50}$) squared, $K/(P*d_{50}^2)$, as a function of sphere diameter (D), illustrating that for computer generated bead-built structures with various porosity from 40% to 60%, sphere sizes ranging from 12 to 20 μm diameter, and varying sphere overlap that the advantage in permeability of the bead built structures, expressed in Permeability Factor (PQ)=$K/(P*d_{50}^2)$ increases with increasing bead size for the individual subsets with same porosity or same bead overlap and also for the general trend that is shown in FIG. 10.

Figure 11:
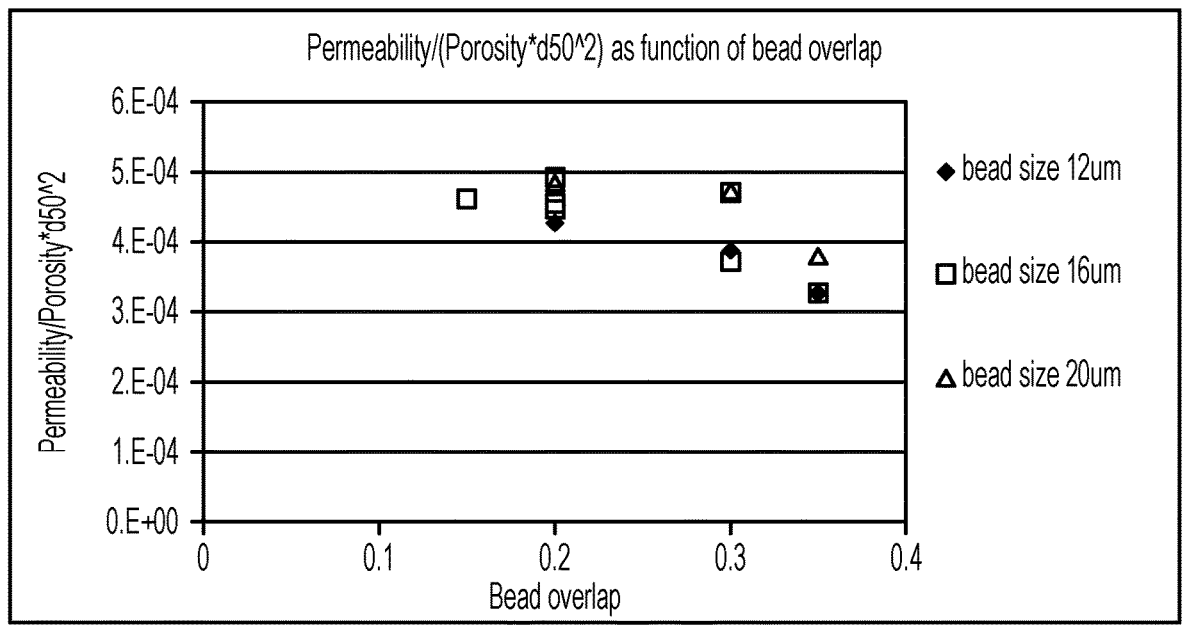
FIG. 11 is a graph of permeability (K) over porosity (P)×median pore size ($d_{50}$) squared, $K/(P*d_{50}^2)$, as a function of bead overlap (dR) according to exemplary embodiments of the disclosure.

FIG. 11 is a graph of permeability (K) over porosity (P)×median pore size ($d_{50}$) squared, $K/(P*d_{50}^2)$, as a function of bead overlap (dR). Bead overlap, dR, (sphere overlap) refers to fraction of radial interference between adjacent connected beads. FIG. 11 illustrates that for computer generated bead-built structures with various porosity from 40% to 60%, sphere sizes ranging from 12 to 20 μm diameter and varying bead overlap, the advantage in permeability of the bead built structures, expressed in Permeability Factor (PQ)= $K/(P*d_{50}^2)$ decreases with increasing bead overlap for the individual subsets with same bead size as well as for the general trend.

Example 4

Flow properties from tomography of processed materials.

Permeability of materials processed from pre-reacted ceramic spheroidal beads as batch material according to exemplary embodiments were compared to comparative materials processed from sintered matter with spherical pores. Permeability and Tortuosity was derived from tomography of these materials. In addition, through-wall and in-wall permeabilities were derived.

TABLE 3

| traditional AT materials with overlapping spherical pore structure | Porosity (tomo) | D50 (tomo) in um | across-wall permeability in Darcy | bulk permeability in Darcy | across wall/bulk permeability in Darcy | porosity *d50^2 (tomo) | tortuosity (tomo) |
|---|---|---|---|---|---|---|---|
| Lab Material 1 | 0.3970 | 11.38 | 0.44 | 0.55 | 0.80 | 5138 | 4.67 |
| Lab Material 2 | 0.4580 | 12.56 | 0.69 | 1.09 | 0.63 | 7228 | 3.65 |
| Lab Material 3 | 0.5040 | 12.50 | 1.27 | 1.28 | 1.00 | 7875 | 2.90 |
| Lab Material 4 | 0.5410 | | 2.63 | 2.59 | 1.02 | | 1.94 |
| Lab Material 5 | 0.5590 | 12.81 | 1.88 | 2.80 | 0.67 | 9177 | 2.26 |
| Lab Material 6 | 0.5860 | 14.43 | 2.88 | 3.39 | 0.85 | 12201 | 1.97 |
| Duratrap AT | 0.4908 | 14.18 | 1.39 | 1.58 | 0.88 | 9867 | |

Table 3 provides data of tomogram derived characteristics of traditional aluminum-titanate (AT) materials with overlapping spherical pores. Table 3 contains porosity, median pore diameter, across-wall permeability, bulk permeability, the ratio of across wall permeability to bulk permeability, and tortuosity.

TABLE 4

| traditional AT materials with overlapping spherical pore structure | Porosity (tomo) | D50 (tomo) in um | across-wall permeability in Darcy | bulk permeability in Darcy | across wall/bulk permeability in Darcy | porosity *d50^2 (tomo) | tortuosity (tomo) |
|---|---|---|---|---|---|---|---|
| Lab Material 11 | 0.6218 | 13.22 | 2.07 | 2.39 | 0.87 | 10872 | 1.70 |
| Lab Material 12 | 0.5788 | 13.87 | 3.57 | | | 11131 | 1.95 |
| Lab Material 13 | 0.5107 | 14.78 | 1.47 | 0.48 | 3.05 | 11149 | 2.10 |
| Lab Material 14 | 0.5105 | 12.64 | 1.36 | 1.41 | 0.96 | 8159 | 2.09 |
| Lab Material 15 | 0.5900 | 11.11 | 1.87 | | | 7281 | 2.05 |
| Lab Material 16 | 0.4742 | 10.93 | 0.87 | | | 5660 | 3.86 |
| Lab Material 17 | 0.5169 | 12.24 | 1.57 | 1.78 | 0.88 | 7744 | 2.27 |
| Lab Material 18 | 0.5562 | 15.30 | 3.17 | 3.61 | 0.88 | 13018 | 1.93 |
| Lab Material 19 | 0.4842 | 12.10 | 1.36 | 1.73 | 0.78 | 7088 | 2.73 |

Table 4 provides data of tomogram derived characteristics of traditional aluminum titanate-based composite materials of cordierite mullite aluminum titanate (CMAT) made from a reactive batch with pore former. Table 4 contains porosity, median pore diameter, across wall permeability, bulk permeability, the ratio of the ratio of across wall permeability to bulk permeability, and tortuosity.

TABLE 5

| Materials made from spraydried prereacted CMAT | Porosity (tomo) | D50 (tomo) in um | across-wall permeability in Darcy | bulk permeability in Darcy | across wall/bulk permeability in Darcy | porosity *d50^2 (tomo) | tortuosity (tomo) |
|---|---|---|---|---|---|---|---|
| lab material 31 | 53.98% | 20.68 | 9.42 | 9.20 | 1.02 | 23089 | 1.79 |
| lab material 32 | 59.44% | 20.53 | 8.59 | 8.38 | 1.03 | 25044 | 1.96 |
| lab material 33 | 56.01% | 18.42 | 7.30 | 7.06 | 1.03 | 19000 | 1.85 |
| lab material 34 | 48.47% | 13.61 | 4.12 | 3.92 | 1.05 | 8983 | 1.94 |
| lab material 35 | 50.11% | 14.95 | 4.29 | 4.62 | 0.93 | 11202 | 2.07 |
| lab material 36 | 62.41% | 18.25 | 8.29 | 9.14 | 0.91 | 20789 | 1.80 |
| lab material 37 | 57.69% | 9.48 | 2.19 | 2.12 | 1.04 | 5187 | 1.88 |
| lab material 38 | 63.60% | 11.34 | 3.00 | 3.02 | 0.99 | 8179 | 1.77 |
| lab material 39 | 58.13% | 10.54 | 2.02 | 2.76 | 0.73 | 6461 | 1.91 |
| lab material 40 | 58.00% | 9.49 | 1.89 | 2.30 | 0.82 | 5221 | 1.95 |
| lab material 41 | 63.58% | 12.40 | 3.02 | 3.00 | 1.01 | 9779 | 1.91 |
| lab material 42 | 49.08% | 7.93 | 0.73 | 0.96 | 0.75 | 3088 | |
| lab material 43 | 49.80% | 13.22 | | | | 8703 | 2.01 |
| lab material 44 | 45.23% | 9.52 | 1.16 | | | 4100 | 2.24 |
| lab material 45 | 54.06% | 11.34 | 2.28 | | | 6952 | 2.02 |
| lab material 46 | 55.56% | 9.24 | 1.47 | | | 4744 | 1.96 |
| lab material 47 | 51.62% | 10.92 | 1.56 | | | 6157 | 2.25 |
| lab material 48 | 49.68% | 12.74 | 2.44 | 2.93 | 0.83 | 8058 | 1.81 |

Table 5 presents data of tomogram derived characteristics of CMAT materials (aluminum titanate-composite) made according to exemplary embodiments of the disclosure from spherical, pre-reacted beads. Table 5 contains porosity, median pore diameter, across-wall permeability, bulk permeability, the ratio of the across wall permeability to bulk permeability, and tortuosity.

TABLE 6

| Milled spraydried, fired beads extruded | Porosity (tomo) | D50 (tomo) in um | across-wall permeability in Darcy | bulk permeability in Darcy | across wall/bulk permeability in Darcy | porosity *d50^2 (tomo) | tortuosity (tomo) |
|---|---|---|---|---|---|---|---|
| lab material 21 | 44.24% | 8.25 | 0.55 | 0.70 | 0.78 | 3009 | |

Table 6 presents data of tomogram derived characteristics of CMAT materials made according to exemplary embodiments of the disclosure from milled shards of pre-reacted material. Table 6 contains porosity, median pore diameter, across-wall permeability, bulk permeability, the ratio of the latter and tortuosity.

Figure 12:
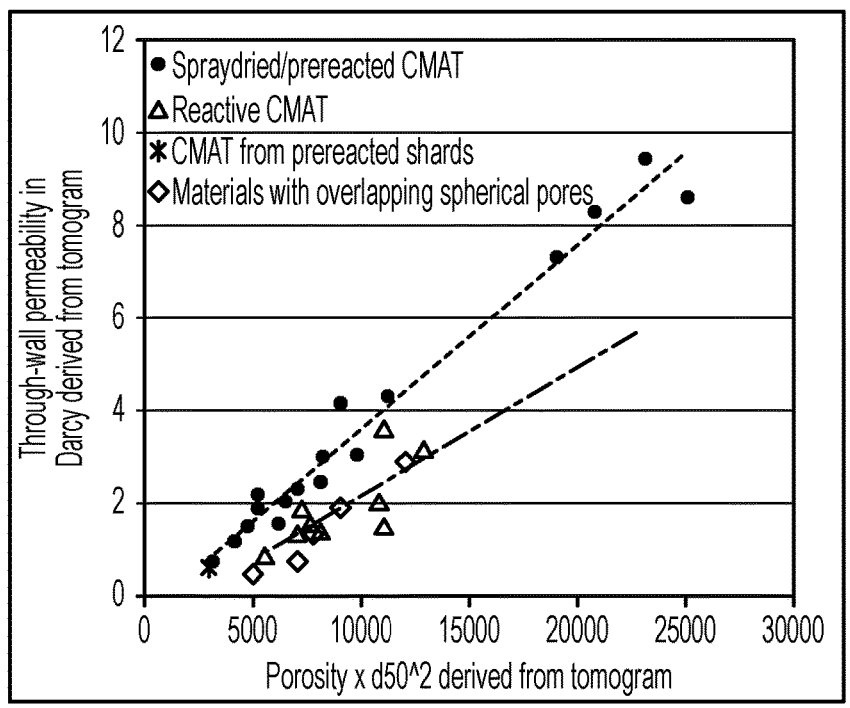
FIG. 12 is a graph comparing across wall (through wall) permeabilities derived from tomograms for experimental materials as a function of the product of tomogram-derived mercury infiltration porosity and square of the median pore diameter for exemplary embodiments of the disclosure and comparative examples.

FIG. 12 is a graph comparing across wall permeabilities derived from tomograms for experimental materials as a function of the product of tomogram-derived mercury infiltration porosity and square of the median pore diameter. FIG. 12 summarizes data from Tables 3-6. Structures according to exemplary embodiments of the disclosure comprising bead-built microstructure made from spray-dried pre-reacted Cordierite Mullite Aluminum Titanate (CMAT) beads are shown as solid spheres, and non-bead-built microstructure materials are shown as open symbols. Open triangles represent structures made from traditional reactive CMAT batch (11-19), open diamonds represent structures with overlapping spherical pores (1-7) and the star represents a CMAT structure made from material that was pre-reacted and milled into shards (22). It was surprisingly found that the bead-built structures according to exemplary embodiments of the disclosure have significantly better permeability as evident in FIG. 12. Even for the same compositions and similar median particle size, the bead-built structure still shows an advantage compared to a shard-built structure. A shard refers to a particle comprising a concave or convex surface or facet portion such as a sliver, splinter, chip, piece, fragment, flake, and the like. The shards were obtained by grinding and milling overfired bead agglomerates.

Figure 13:
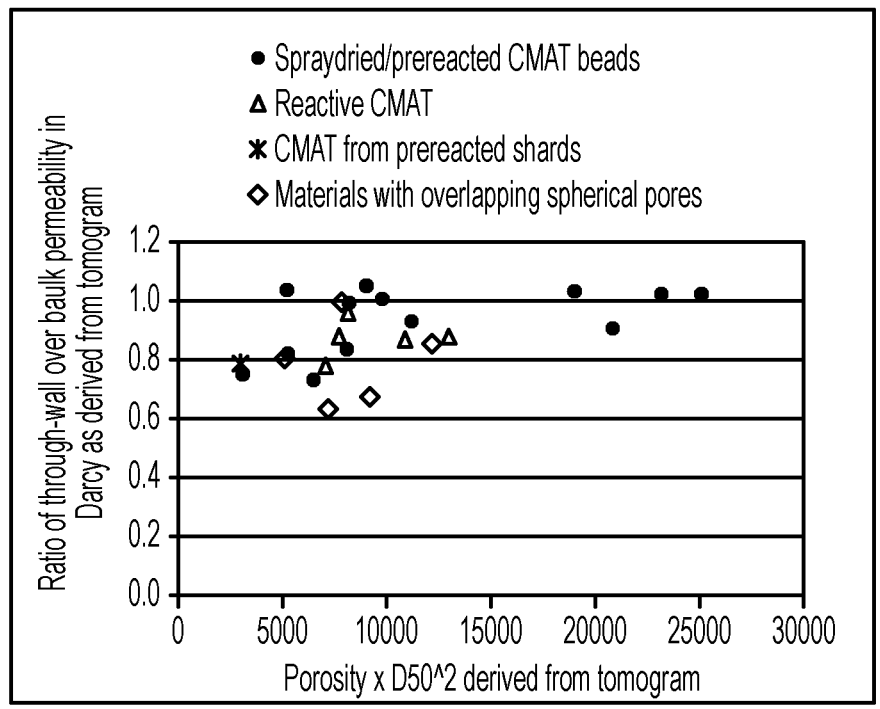
FIG. 13 is a graph comparing ratios of through-wall to bulk permeabilities as derived from tomograms of experimental structures as function of the product of tomogram-derived mercury infiltration porosity and square median pore diameter, $P*d_{50}^2$ according to exemplary embodiments of the disclosure and comparative examples.

FIG. 13 is a graph comparing ratios of through-wall to bulk permeabilities as derived from tomograms of experimental structures as function of the product of tomogram-derived mercury infiltration porosity and square median pore diameter, $P*d_{50}^2$. Structures according to exemplary embodiments of the disclosure comprising bead-built microstructure made from spray-dried pre-reacted CMAT beads are shown as solid spheres and non-bead-built microstructure materials are shown as open symbols. Open triangles represent structures made from traditional reactive CMAT batch (11-19), open diamonds represent structures with overlapping spherical pores (1-7) and the star represents a CMAT structure made from material that was pre-reacted into a block and then milled into shards (22). FIG. 13 shows that for most of the bead-built structures according to exemplary embodiments of the disclosure, across wall (through wall) permeability ($K_{TW}$) and in-wall permeability (bulk permeability) ($K_{bulk}$) are very similar (ratio=1), illustrating that surface porosity is very similar to the bulk porosity for these bead-built structures.

In traditional materials, the surface porosity is typical smaller, in many cases even much smaller than the bulk porosity, so that the through-wall flow is restricted. The materials according to exemplary embodiments of the disclosure are free of such a disadvantage, when fired at low temperatures and/or short times so that bead overlap is minimal. The few bead-built materials with ratios<1 effectively have been fired at higher temperatures and have undergone more sintering that created larger bead overlap.

Figure 14:
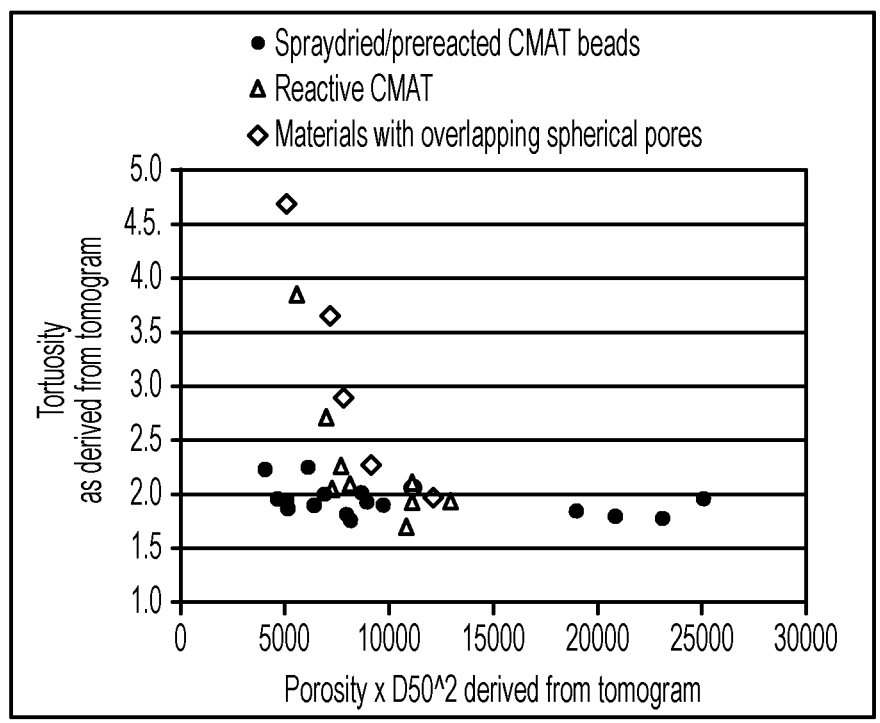
FIG. 14 is a graph comparing ratios of material tortuosity as derived from tomograms of experimental structures as function of the product of tomogram-derived mercury infiltration porosity and square median pore diameter, $P*d_{50}^2$ according to exemplary embodiments of the disclosure and comparative examples.

FIG. 14 is a graph comparing ratios of material tortuosity as derived from tomograms of experimental structures as function of the product of tomogram-derived mercury infiltration porosity and square median pore diameter, $P*d_{50}^2$. Structures according to exemplary embodiments of the disclosure comprising bead-built microstructure made from spray-dried pre-reacted CMAT beads are shown as solid spheres and non-bead-built microstructure materials are shown as open symbols. Open triangles represent structures made from traditional reactive CMAT batch (11-19), open diamonds represent structures with overlapping spherical pores (1-7) and the star represents a CMAT structure made from material that was pre-reacted and milled into shards (22). FIG. 14 shows that for high $P*d_{50}^2$, the tortuosity remains above 1.5 indicating no significant drop in filtration efficiency (FE). It can be seen that for most medium and high porosity bead-built structures the tortuosity is in the same range as for traditional materials. Even for very high porosity and large $d_{50}$, tortuosity remains close to 2.

Example 5

Permeability of materials as derived by porometry measurements.

TABLE 7

| Example | CPSI | Wall thickness (mm) | Spray dried, pre-reacted beads | Bead size in um | hollow bead | Mercury porosity in % | MIP d50 in um | Porosity *d50^2 |
|---|---|---|---|---|---|---|---|---|
| Sample 101 | 300/14 | 0.38 | no | | | 58 | 21.8 | 27564 |
| Sample 102 | 300/14 | 0.44 | yes | 40 | no | 60.3 | 20.8 | 26088 |
| Sample 103 | 300/14 | 0.43 | no | | | 56.10 | 15.40 | 13305 |
| Sample 104 | 300/14 | 0.33 | yes | 40 | no | 54.00 | 23.20 | 29065 |
| Sample 105 | 300/14 | 0.36 | yes | 35 | no | 53.90 | 16.74 | 15104 |
| Sample 106 | 300/14 | 0.37 | yes | 35 | no | 54.10 | 18.60 | 18716 |
| Sample 107 | 300/14 | 0.41 | yes | 35 | no | 52.30 | 16.00 | 13389 |
| Sample 108 | 300/14 | 0.40 | yes | 35 | no | 50.80 | 16.30 | 13497 |
| Sample 109 | 300/14 | 0.40 | no | | | 60.9 | 18.3 | 20395 |
| Sample 110 | 300/14 | 0.35 | yes | 27 | yes | 65 | 14.6 | 13855 |
| Sample 111 | 300/14 | 0.37 | yes | 27 | yes | 62.4 | 14.5 | 13120 |
| Sample 112 | 300/14 | 0.39 | yes | 27 | yes | 60.3 | 14.8 | 13208 |
| Sample 113 | 300/14 | 0.35 | yes | 27 | yes | 60.7 | 13.8 | 11560 |
| Sample 114 | 300/14 | 0.36 | yes | 27 | yes | 61.3 | 14.9 | 13609 |
| Sample 115 | 300/14 | 0.37 | yes | 27 | yes | 61 | 14.1 | 12127 |
| Sample 116 | 300/14 | 0.4 | no | | | 59.5 | 14 | 11662 |
| Sample 117 | 300/14 | 0.4 | no | | | 58.3 | 12.9 | 9702 |
| Sample 118 | 300/14 | 0.4 | no | | | 59 | 12.6 | 9367 |
| Sample 119 | 300/14 | 0.4 | no | | | 58.1 | 12 | 8366 |

TABLE 7-continued

| Example | CPSI | Wall thickness (mm) | Spray dried, pre-reacted beads | Bead size in um | hollow bead | Mercury porosity in % | MIP d50 in um | Porosity *d50^2 |
|---|---|---|---|---|---|---|---|---|
| Sample 120 | 300/14 | 0.4 | no | | | 52.7 | 16.9 | 15052 |
| Sample 121 | 300/14 | 0.4 | no | | | | | |
| Sample 122 | 300/14 | 0.4 | no | | | 46.6 | 9.2 | 3944 |
| Sample 123 | 300/14 | 0.4 | no | | | 60.2 | 18.4 | 20381 |
| Sample 124 | 300/14 | 0.4 | yes | 40 | yes | 52.5 | 17 | 15173 |
| Sample 125 | 300/14 | 0.4 | yes | 40 | no | 48.5 | 9.5 | 4377 |
| Sample 126 | 300/14 | 0.4 | yes | 40 | yes | | | |

TABLE 8

| Example | fraction of intra-bead porosity in % of total porosity | corrected porosity (−hollow bead contribution) in % | corrected d50 im um | Pcorrected *d50corr^2 | SPD/PR Permeability in Darcy | reactive traditional Permeability in Darcy |
|---|---|---|---|---|---|---|
| Sample 101 | | | | | | 3.75 |
| Sample 102 | | | | 26088 | 6.53 | |
| Sample 103 | | | | | | 2.62 |
| Sample 104 | | | | 29065 | 5.80 | |
| Sample 105 | | | | 15104 | 3.58 | |
| Sample 106 | | | | 18716 | 4.09 | |
| Sample 107 | | | | 13389 | 2.33 | |
| Sample 108 | | | | 13497 | 2.09 | |
| Sample 109 | | | | | | 3.63 |
| Sample 110 | 5.50 | 61.43 | 14.70 | 13273 | 2.36 | |
| Sample 111 | 5.00 | 59.28 | 15.10 | 13516 | 2.06 | |
| Sample 112 | 5.50 | 56.98 | 15.30 | 13339 | 2.18 | |
| Sample 113 | 4.00 | 58.27 | 13.80 | 11097 | 2.35 | |
| Sample 114 | 5.00 | 58.24 | 15.10 | 13278 | 1.99 | |
| Sample 115 | 5.00 | 57.95 | 14.30 | 11850 | 2.67 | |
| Sample 116 | | | | | | 2.06 |
| Sample 117 | | | | | | 2.16 |
| Sample 118 | | | | | | 1.58 |
| Sample 119 | | | | | | 1.41 |
| Sample 120 | | | | | | 1.80 |
| Sample 121 | | | | | | 1.53 |
| Sample 122 | | | | | | 0.93 |
| Sample 123 | | | | | | 3.97 |
| Sample 124 | 0.00 | | | 15173 | 3.41 | |

TABLE 8-continued

| Example | fraction of intra-bead porosity in % of total porosity | corrected porosity (−hollow bead contribution) in % | corrected d50 im um | Pcorrected *d50corr^2 | SPD/PR Permeability in Darcy | reactive traditional Permeability in Darcy |
|---|---|---|---|---|---|---|
| Sample 125 | 9.00 | 44.14 | 9.50 | 3983 | 0.93 | |
| Sample 126 | | | | | | |

Tables 7 and 8 presents a summary of porometry measurements of comparative reactive batch CMAT materials and materials made from pre-reacted CMAT beads according to exemplary embodiments of the disclosure.

Figure 15:
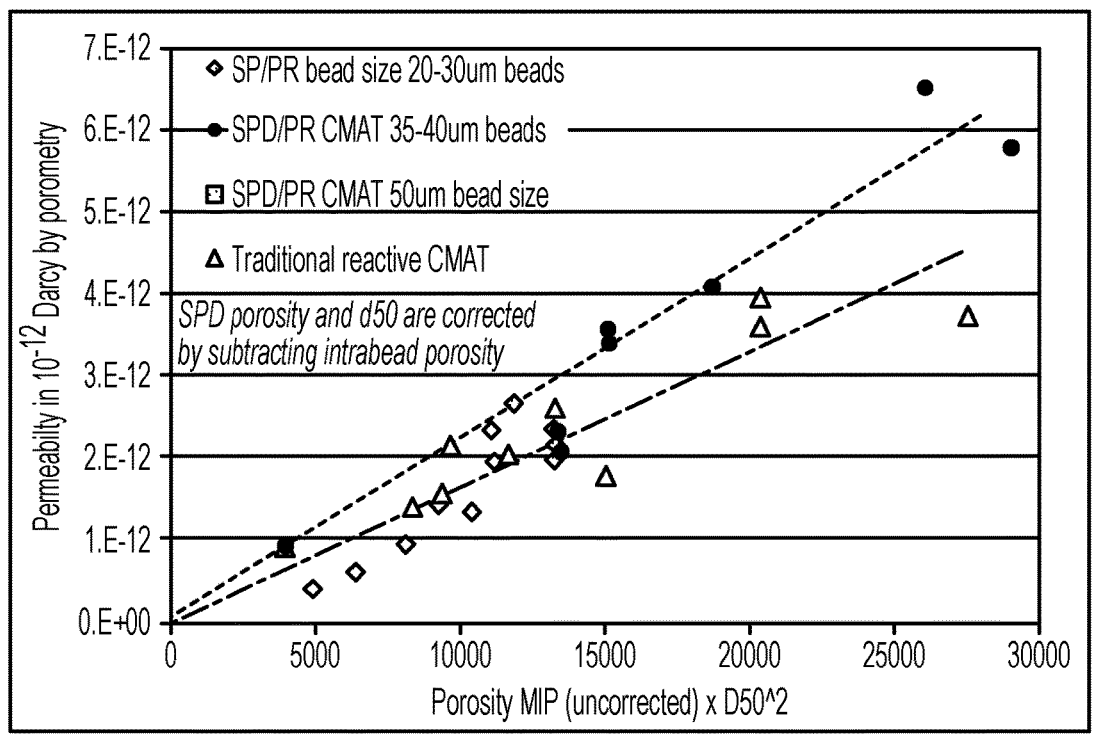
FIG. 15 is a graph of wall permeability as derived from porometry measurements as function of the product of experimental mercury infiltration porosity and square median pore diameter, $P*d_{50}^2$ according to exemplary embodiments of the disclosure and comparative examples.

FIG. 15 is a graph of through-wall permeability as derived from porometry measurements as function of the product of experimental mercury infiltration porosity and square median pore diameter, $P*d_{50}^2$. Structures according to exemplary embodiments of the disclosure comprising bead-built microstructure made from spray-dried pre-reacted CMAT beads are shown as solid symbols and non-bead-built microstructure structures are shown as open symbols. Surprisingly and unexpectedly, superior permeability is shown for many bead-built structures compared to non-bead-built microstructure materials. Relatively higher permeability was reached with larger bead size. Some bead-built structures show relatively low permeability in this type of porometry measurement. The reasons are either large bead overlap by excessive sintering or measurement artifacts for honeycomb bodies of 1 in (2.54 cm) diameter, where several slabs were glued together for the porometry measurements to make structures large enough to measure and, as a result, some fraction of the cross section was infiltrated with the glue blocking through-flow.

Pressure drop was measured for 2 in (5.08 cm) diameter (300/14) extruded and fired bead-built honeycomb body filters of bead-build microstructures. Example SBS according to exemplary embodiments of the disclosure was created with pea starch and graphite as pore formers and Example SBT was created with potato starch and graphite as pore formers according to exemplary embodiments of the disclosure. A comparative example, Comparative Example SBR, of high porosity (HP) AT reactive sintering batch was extruded at the same time under the same conditions and fired. Traditional HP AT materials can have 57% porosity and a median pore diameter of about 17-18 μm. Example SBS, depending on firing conditions, had 60-65% porosity and $d_{50}$ of about 14.0-15.5 μm. Example SBT had about 59-62% porosity and median pore diameter of about 14.5-15.5 μm. Honeycomb bodies were plugged in a checkerboard pattern and pressure drop was measured for bare clean and soot-loaded parts. Results indicated that for (300/14) 2 in (5.08 cm) diameter/6 in (15.24 cm) length filters, despite the much smaller median pore diameter, the Example SBS and Example SBT filters from spraydried, prereacted CMAT batch according to exemplary embodiments show very similar bare, clean pressure drop to the Comparative Example SBR. However, the Example SBS and Example SBT filters are expected to have thicker walls than the Comparative Example SBR, so it is expected that the final corrected pressure drop should be lower for the Example SBS and Example SBT filters according to exemplary embodiments of the disclosure.

A comparison of pressure drop of bare filters as a function of soot load for filter Examples SBS and SBT according to exemplary embodiments of the disclosure made from bead-built HP AT (spray dried/pre-reacted batch) and Comparative Example SBR filter made of traditional reactive batches of HP AT. The honeycomb bodies were (300/14) 2 in (5.08 cm) diameter/6 in (15.24 cm) length filters. The data showed that despite the much smaller median pore diameter of the Examples SBS and SBT filters from spray dried, pre-reacted HP AT batch, the bare, soot-loaded pressure drop was very similar to the Comparative Example SBR. The knee was negligible as expected for high porosity filters. However, the Example SBS and Example SBT filters are expected to have thicker walls than the Comparative Example SBR, so it is expected that the final corrected soot loaded pressure drop should be lower for the Example SBS and Example SBT filters according to exemplary embodiments of the disclosure.

Example 6

Decrease in permeability in processed materials according to exemplary embodiments of the disclosure with increasing sphere overlap.

In materials that are processed from pre-reacted, inorganic spheres as batch material according to exemplary embodiments of the disclosure, the material is rather stable during firing and the individual spheres remain well preserved during short and/or low temperature firing of the honeycomb bodies. However, extended and/or high temperature firing leads to sintering, in which the sphere overlap increases and the permeability decreases since the sintered bead microstructure evolves more towards a traditional microstructure. Even though the theory behind the sphere overlap evolution during sintering is not fully understood, the increasing sphere overlap was observed experimentally and can be described by an evolution of permeability with firing temperature and/or time.

Several examples of materials that were extruded from inorganic reacted spheres are provided that show the trend of decreasing permeability with firing time and/or temperature. Table 9 presents data that shows that in materials that are processed from pre-reacted, inorganic spheres as batch material, the material is rather stable during firing and the individual spheres remain well preserved during short and/or low temperature firing of the honeycomb body. However, extended and/or high temperature firing can lead to sintering, in which the sphere overlap increases. Table 9 summarizes in blue several examples of materials that were made from pre-reacted spheres as inorganic batch and also includes a traditional material for comparison. It can be seen that in the materials according to exemplary embodiments of the disclosure, the permeability decreases with increase in sintering time and/or temperature and thus with increasing bead overlap.

TABLE 9

| Part Information | extruded size std (300/140 | Material | Spraydried bead type | Bead size in um | CPSI |
|---|---|---|---|---|---|
| QSL 1340 C./16 hrs | 2" ram | Traditional CMAT cord/mu = 1 | no | | 300/14 |
| QSL 1355 C./16 hrs | 2" ram | 300/14 | | | |
| RWJ 74717 (HW) 1280 C./2 hrs | 1" ram | SPDPRCMAT | HW CMAT from oxides A1000, Ludox, Magchem 10 | | 300/14 |
| RWJ 74717 (HW) 1320 C./2 hrs | 1" ram | SPDPRCMAT | HW CMAT from oxides A1000, Ludox, Magchem 10 | | 300/14 |
| RWK 74718 (HW) 1280 C./2 hrs | 1" ram | SPDPRCMAT | HW CMAT from oxides A1000, Ludox, Magchem 10 | | 300/14 |
| RWK 74718 (HW) 1320 C./2 hrs | 1" ram | SPDPRCMAT | HW CMAT from oxides A1000, Ludox, Magchem 10 | | 300/14 |
| RWL 74719 (HX) 1280 C./2 hrs | 1" ram | SPDPRCMAT | HX is SPD/PR CMAT from clay/talc | | 300/14 |
| RWL (HX) 1340 C./2 hrs | 1" ram | SPDPRCMAT | HX is SPD/PR CMAT from clay/talc | | 300/14 |
| RWM 74720 (HZ) 1280 C./2 hrs | 1" ram | SPDPRCMAT | SPD/PR HZ CMAT Mgcarbonate | | 300/14 |

| Part Information | Wall thickness (mm) | Mercury Porosity (%) | MIP d50 in um | Porosity *d50^2 | Permeability from porometry in Darcy | Permability (Porosityxd50^2) | Firing Temp | ratio perm/perm porxd50^2 high T/low T |
|---|---|---|---|---|---|---|---|---|
| QSL 1340 C./16 hrs | 0.430 | 56.10 | 15.40 | 13305 | 2.62 | 1.97E-04 | 1340 | |
| QSL 1355 C./16 hrs | 0.430 | 58.10 | 14.00 | 11388 | 2.75 | 2.41E-04 | 1355 | 1.23 |
| RWJ 74717 (HW) 1280 C./2 hrs | 0.358 | 53.90 | 16.74 | 15104 | 3.58 | 2.37E-04 | 1280 | |
| RWJ 74717 (HW) 1320 C./2 hrs | 0.3700 | 54.10 | 18.60 | 18716 | 4.09 | 2.19E-04 | 1320 | 0.92 |
| RWK 74718 (HW) 1280 C./2 hrs | 0.408 | 52.30 | 16.00 | 13389 | 2.33 | 1.74E-04 | 1280 | |
| RWK 74718 (HW) 1320 C./2 hrs | 0.401 | 50.80 | 16.30 | 13497 | 2.09 | 1.55E-04 | 1320 | 0.89 |
| RWL 74719 (HX) 1280 C./2 hrs | 0.332 | 55.40 | 15.80 | 13830 | 2.7 | 1.95E-04 | 1280 | |
| RWL (HX) 1340 C./2 hrs | 0.348 | 50.78 | 15.00 | 11426 | 1.56 | 1.37E-04 | 1320 | 0.7 |
| RWM 74720 (HZ) 1280 C./2 hrs | 0.401 | 58.10 | 13.45 | 10510 | 2.03 | 1.93E-04 | 1280 | |

Material processing and experimental material microstructures rendered according to exemplary embodiments of the disclosure.

Figure 16:
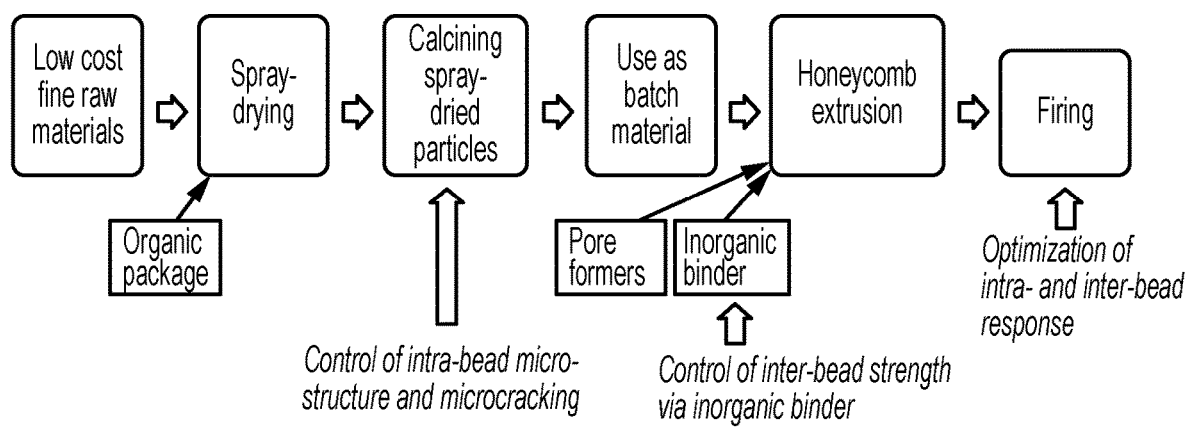
FIG. 16 is a schematic showing process steps for making filters from pre-reacted ceramic beads according to an exemplary embodiment.

FIG. 16 is a schematic showing process steps for making filters from pre-reacted CMAT beads according to an exemplary embodiment. For example, in an operation, CMAT beads were made by spray-drying a 25% solid loading aqueous slurry of low cost inorganic source materials for silica, alumina, titania and magnesia with sintering aid and an organic binder package. Green solid spheres with narrow particle size distribution and median particle sizes of 20 to 50 micrometers were made. The spheres were calcined until completion of the CMAT composite formation by solid state reaction. In an example, calcining to full reaction was carried out at 1250 to 1350° C. for 1 hour (h) to 10 h. In an example, ceramic beads that were composites of cordierite, mullite and Mg-substituted aluminum titanate or mullite and Mg-stabilized aluminum titanate that contained small levels of glass and Ce-titanate were made.

The pre-reacted spherical CMAT particles were then used as batch material for a honeycomb extrusion with low levels of inorganic binder, cellulose binder, pore formers, water, and organic extrusion aids. In an example, the ceramic extrusion paste was extruded on a ram extruder as 1" or 2" (300/13) or (300/14) honeycomb bodies. The honeycomb bodies were dried, for example, either in air or in a microwave oven.

The extruded and dried honeycomb bodies were fired for a relatively short time at high temperature to allow bonding of the pre-reacted beads. In an example, the honeycomb bodies were fired for 1 h to 6 h at a temperature that was lower than the temperature used for pre-reacting the beads such as 1280-1350° C. While CMAT was used and described herein for illustrative and exemplary purposes, other materials were also used and the processes can be adjusted accordingly.

In exemplary embodiments of the disclosure the pre-reacted spherical particles (beads) can comprise inorganic, reaction-sintered oxides comprising at least one or more major crystalline phases such as CMAT with three major phases, aluminum titanate (AT)-Feldspar with two major phases, AT-mullite with two major phases, AT-cordierite with two major phases, and the like, with or without glass. For example, the beads can comprise CMAT, AT-Feldspar, AT-mullite, or AT-cordierite with or without glass, with or without unreacted sources of aluminum, titanium, silicon, magnesium, calcium, and the like, with or without a sintering aid such as rare earth oxide such as ceria, yttria, lanthanum oxide, other lanthanide oxides, and the like, and boron, and other phases such as corundum, spinel, and the like, or combinations thereof. As further examples, the beads can comprise a single phase cordierite, mullite, AT, and the like with or without glass, with or without unreacted sources of aluminum, titanium, silicon, magnesium, calcium, and the like, with or without a sintering aid such as rare earth oxide such as ceria, yttria, lanthanum oxide, other lanthanide oxides, and boron, and the like.

Figure 17A:
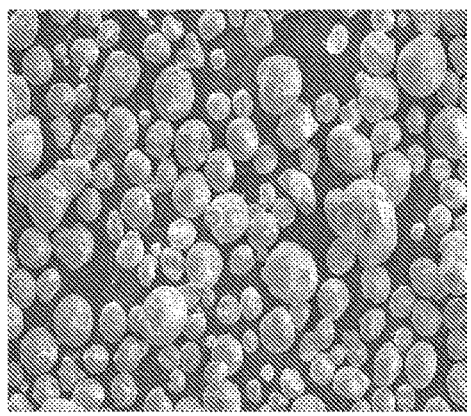
FIG. 17A is an SEM backscatter micrograph of green spray-dried spheres used to make the composite beads as used for processing bead-built microstructures according to exemplary embodiments of the disclosure.
Figure 17B:
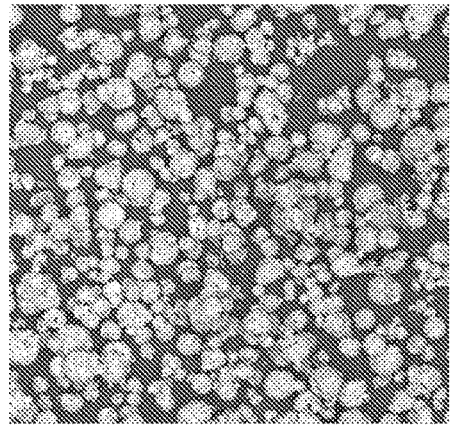
FIG. 17B is an SEM backscatter micrograph of spheres such as shown in FIG. 17A calcined and pre-reacted.

FIG. 17A is an SEM backscatter micrograph of green spray-dried spheres used to make the composite beads as used for processing bead-built microstructures according to exemplary embodiments of the disclosure. FIG. 17B is an SEM backscatter micrograph of spheres such as shown in FIG. 17A calcined and pre-reacted. The composition of the beads shown in FIG. 17A was CMAT precursor materials with ceria. The composition of the calcined and pre-reacted beads shown in FIG. 17B was CMAT with glass and ceria-titanate.

Figure 18A:
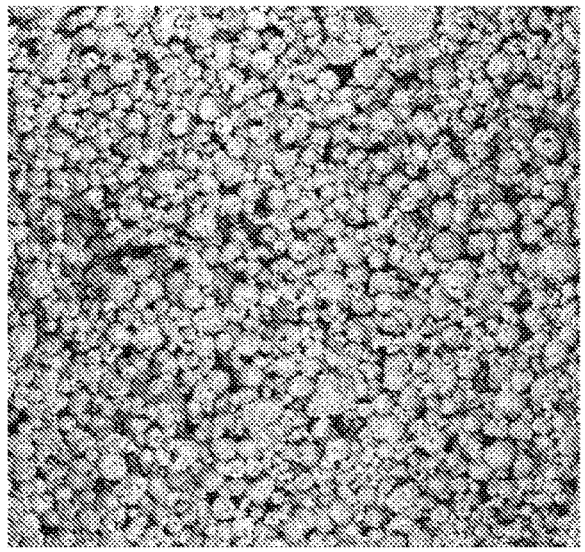
FIGS. 18A and 18B are SEM backscatter micrographs of extruded honeycomb body filter wall structures comprising bead-built microstructures according to exemplary embodiments of the disclosure.
Figure 18B:
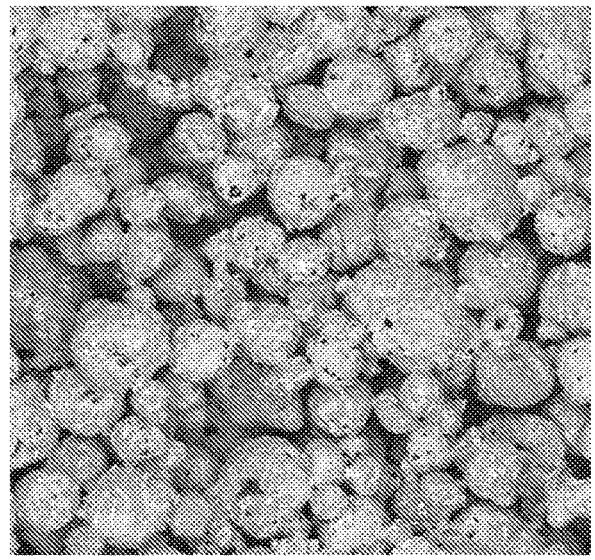

FIGS. 18A and 18B are SEM backscatter micrographs of extruded honeycomb body filter wall structures comprising bead-built microstructures according to exemplary embodiments of the disclosure. The honeycomb body microstructure comprises beads such as shown in FIG. 17B arranged in a 3D scaffolding with very little bead overlap and high porosity evident. The globular portions are also evident between connections to adjacent beads.

Figure 19:
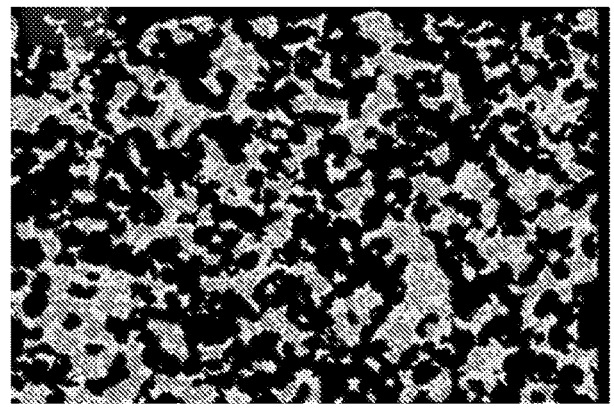
FIG. 19 is an SEM backscatter micrograph of a cross-section through extruded honeycomb body filter wall structures comprising microstructures made from traditional reactive aluminum titanate composite batch.

FIG. 19 is an SEM backscatter micrograph of a cross-section through extruded honeycomb body filter wall structures comprising microstructures made from traditional reactive CMAT batch. The microstructure can be seen to not include globular portions of matter.

Figure 20:
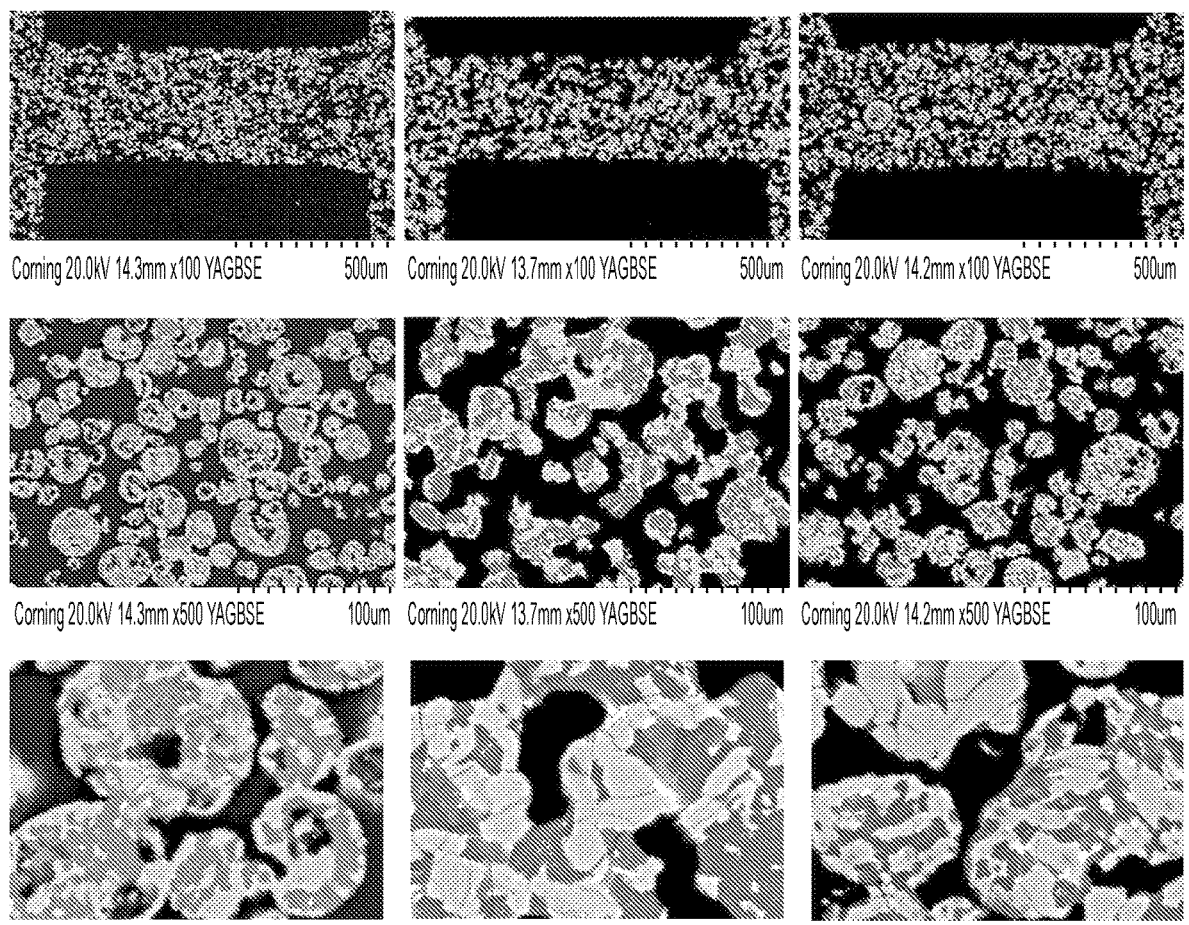
FIG. 20 are SEM backscatter micrographs of cross-sections through extruded and fired honeycomb body filter wall structures of bead-built aluminum titanate composite microstructure according to exemplary embodiments of the disclosure.

FIG. 20 are SEM backscatter micrographs of random cross-sections through extruded and fired honeycomb body filter wall structures of bead-built microstructure according to exemplary embodiments of the disclosure. The globular portions appear as circular portions of matter between connections to adjacent beads. For example, the connections can be bonds such as diffusion bonds or fused portions of the beads as well as an inorganic binder material.

According to exemplary embodiments, a porous body comprises a porosity (P) as a fraction in a range of about 0.3 to about 0.7; a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm); a tortuosity in a range of about 1.8 to 3; and a median pore size diameter $d_{50}$ in a range of about 10 μm to about 25 μm. For example, the porous body can comprise a permeability factor PQ>0.03, PQ>0.04, PQ>0.046, or even PQ>0.05.

According to these exemplary embodiments, the porous body can further comprise a connected bead microstructure comprising beads and bead connections wherein adjacent beads are connected by the bead connections, wherein PQ is directly proportional to bead size, and wherein in a random cross section through the body, the beads appear as globular portions. In these exemplary embodiments the globular portions refers to matter having curved boundaries such as nearly circular, oval, or the like.

According to these exemplary embodiments, the porous body has a ratio of through-wall permeability $K_{TW}$ to bulk permeability $K_{bulk}$ that is greater than 0.9 ($K_{TW}/K_{bulk}$>0.9). For example, $K_{TW}/K_{bulk}$>0.95, or even $K_{TW}/K_{bulk}$>0.99. According to these exemplary embodiments, the porous body has the porosity (% P) in a range of about 30% to about 40%. According to these exemplary embodiments, the porous body has the porosity (% P) is in a range of about 40% to about 70%.

According to these exemplary embodiments, the porous body further comprises a connected bead microstructure, comprising beads; bead connections, wherein adjacent beads are connected by the bead connections; and a bead overlap of less than about 0.5, bead overlap being fraction of radial interference between adjacent connected beads. In these exemplary embodiments the beads comprise inorganic, reaction-sintered spheres, and in a random cross section through the body, the beads appear as globular portions.

According to these exemplary embodiments, the inorganic, reaction-sintered spheres comprise oxides comprised of at least one crystalline phase and a glassy phase. According to these exemplary embodiments, the crystalline phase comprises at least one of pseudobrookite, cordierite, mullite, spinel, strontium, aluminum feldspar, beta-spodumene, and beta-eucryptite.

According to these exemplary embodiments, the porous body the inorganic, reaction-sintered spheres are comprised of at least one of alumina, titania, silica, rare earth, SiC, SiN, and alkaline earth oxides. According to these exemplary embodiments, a bead connection comprises binder on less than 50% of each bead surface and the bead microstructure further comprises pores. According to these exemplary embodiments, the bead microstructure further comprises pores between surfaces of the beads.

According to these exemplary embodiments, bead overlap is less than about 0.2, for example, less than about 0.05. According to these exemplary embodiments, the median bead diameter ($D_{bead}$) is in a range of about 14 μm<$D_{bead}$≤50 μm. For example, $D_{bead}$ is in a range of about 20 μm<$D_{bead}$≤45 μm, or even $D_{bead}$ is in a range of about 30 μm<$D_{bead}$≤40 μm.

According to these exemplary embodiments, the porous body comprises a ceramic body comprising at least one of aluminum titanate pseudobrookite, cordierite, feldspar, glass, and mullite. According to these exemplary embodiments, the porous body further comprises a plurality of porous ceramic channel walls extending axially from opposing first and second end faces defining cell channels therebetween; and an outer peripheral surface extending axially. According to these exemplary embodiments, the porous body further comprises plugs disposed in a portion of the cell channels forming at least one of a particulate filter and a partial particulate filter. According to these exemplary embodiments, the porous body further comprises at least one of a catalyst coating disposed in channel walls and a catalyst coating disposed on channel walls.

According to exemplary embodiments, a porous body comprises a connected bead microstructure, comprising beads, wherein in a random cross section through the body, the beads appear as globular portions; bead connections, wherein adjacent beads are connected by the bead connections; and a bead overlap of less than about 0.5, bead overlap being fraction of radial interference between adjacent connected beads, wherein the beads comprise a median bead diameter ($D_{bead}$) in a range of about 20 μm<$D_{bead}$≤50 μm, and a bead diameter distribution ($D_{breadth}$) of less than 100 μm, $D_{breadth}$ being $((D_{90}-D_{10})/D_{50})$.

According to exemplary embodiments, a porous body comprises a porosity (P) as a fraction in a range of about 0.3 to about 0.4; a permeability (K) greater than or equal to about $0.017 \cdot P \cdot d_{50}^2$, where $d_{50}$ is the mean pore size in micrometers (μm); a tortuosity in a range of about 2 to 5; and a median pore size diameter $d_{50}$ in a range of about 10 μm to about 35 μm.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A porous ceramic body, comprising:
   an interconnected bead microstructure comprising bead portions and bead connection portions, wherein adjacent bead portions are connected by the bead connection portions;
   a porosity (P) as a fraction in a range of about 0.3 to about 0.7;
   a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm);
   a tortuosity in a range of about 1.8 to 3; and
   a median pore size diameter $d_{50}$ in a range of about 10 μm to about 25 μm;
   wherein PQ is directly proportional to bead size, and
   wherein in a random cross section through the body, the bead portions appear as globular.

2. The body of claim 1, wherein PQ>0.05.

3. The body of claim 1, wherein a median bead portion diameter ($D_{bead}$) of the bead portions is in a range of about 14 μm<$D_{bead}$≤50 μm.

4. The body of claim 1, comprising at least one of aluminum titanate, pseudobrookite, cordierite, feldspar, glass, and mullite.

5. The ceramic body of claim 1, comprising: a plurality of porous ceramic channel walls extending axially from opposing first and second end faces defining channels therebetween; and an outer peripheral surface extending axially.

6. The body of claim 5, further comprising plugs disposed in a portion of the cell channels forming at least one of a particulate filter and a partial particulate filter.

7. The body of claim 5, further comprising at least one of a catalyst coating disposed in channel walls and a catalyst coating disposed on channel walls.

8. A porous ceramic body comprising:
   an interconnected bead microstructure comprising bead portions and bead connection portions wherein adjacent bead portions are connected by the bead connection portions;
   a porosity (P) as a fraction in a range of about 0.3 to about 0.7;
   a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm);
   a tortuosity in a range of about 1.8 to 3; and
   a median pore size diameter $d_{50}$ in a range of about 10 μm to about 25 μm;
   wherein PQ is inversely proportional to bead overlap, bead overlap being fraction of radial interference between adjacent connected bead portions,
   wherein in a random cross section through the body, the bead portions appear as globular.

9. A porous ceramic body comprising:
   a porosity (P) as a fraction in a range of about 0.3 to about 0.7;
   a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm);
   a tortuosity in a range of about 1.8 to 3; and
   a median pore size diameter $d_{50}$ in a range of about 10 μm to about 25 μm;
   wherein a ratio of through-wall permeability $K_{TW}$ to bulk permeability $K_{bulk}$ is greater than 0.9 ($K_{TW}/K_{bulk}$>0.9).

10. The body of claim 9, wherein $K_{TW}/K_{bulk}$>0.99.

11. A porous ceramic body comprising:
    an interconnected bead microstructure, comprising:
       bead portions;
       bead connection portions, wherein adjacent bead portions are connected by the bead connection portions;
    a porosity (P) as a fraction in a range of about 0.3 to about 0.7;
    a permeability factor PQ>0.025, wherein PQ is $(K_{bulk})/(P \cdot d_{50}^2)$, $K_{bulk}$ being bulk permeability in Darcy, and $d_{50}$ being the mean pore size in micrometers (μm);
    a tortuosity in a range of about 1.8 to 3; and
    a median pore size diameter $d_{50}$ in a range of about 10 μm to about 25 μm; and
    a bead overlap of less than about 0.5, the bead overlap being a fraction of radial interference between adjacent connected bead portions,
    wherein the bead portions comprise inorganic, reaction-sintered spheres, and
    wherein in a random cross section through the body, the bead portions appear as globular.

12. The body of claim 11, wherein the inorganic, reaction-sintered spheres comprise oxides comprised of at least one crystalline phase and a glassy phase.

13. The body of claim 12, wherein the crystalline phase comprises at least one of pseudobrookite, cordierite, mullite, spinel, strontium, aluminum feldspar, beta-spodumene, and beta-eucryptite.

14. The body of claim 11, wherein the inorganic, reaction-sintered spheres are comprised of at least one of alumina, titania, silica, rare earth, SiC, SiN, and alkaline earth oxides.

15. The body of claim 11, wherein each bead connection portion comprises binder on less than 50% of surfaces of the bead portions and the bead microstructure further comprises pores.

16. The body of claim 11, wherein the bead microstructure further comprises pores between surfaces of the bead portions.

17. The body of claim 11, wherein the bead overlap is less than about 0.2.

18. The body of claim 11, wherein the bead overlap is less than about 0.05.

19. A porous body, comprising:
    a porosity (P) as a fraction in a range of about 0.3 to about 0.4;
    a permeability (K) greater than or equal to about $0.017 \cdot P \cdot d_{50}^2$, where $d_{50}$ is the mean pore size;
    a tortuosity in a range of about 2 to 5; and
    a median pore size diameter $d_{50}$ as measured by mercury porosimetry in a range of about 10 μm to about 35 μm.

* * * * *

UNITED STATES PATENT AND TRADEMARK OFFICE
CERTIFICATE OF CORRECTION

| | | |
|---|---|---|
| PATENT NO. | : 11,229,902 B2 | Page 1 of 1 |
| APPLICATION NO. | : 16/304853 | |
| DATED | : January 25, 2022 | |
| INVENTOR(S) | : Monika Backhaus-Ricoult et al. | |

It is certified that error appears in the above-identified patent and that said Letters Patent is hereby corrected as shown below:

On the Title Page

In item (72), in Column 1, in "Inventors", Line 1, delete "Bourron" and insert -- Bourron-Marlotte --.

Signed and Sealed this
Seventh Day of January, 2025

Derrick Brent
*Acting Director of the United States Patent and Trademark Office*